US011625692B2

(12) United States Patent
Collins et al.

(10) Patent No.: US 11,625,692 B2
(45) Date of Patent: *Apr. 11, 2023

(54) GENERATING A WASTE PROFILE

(71) Applicant: Environmental Data Systems, LLC, Akron, OH (US)

(72) Inventors: Daniel Paul Collins, Uniontown, OH (US); Douglas Yoder, Akron, OH (US); Michael Haritakis, Hudson, OH (US); Patrick Sullivan, University Heights, OH (US)

(73) Assignee: ENVIRONMENTAL DATA SYSTEMS, LLC, Akron, OH (US)

( * ) Notice: Subject to any disclaimer, the term of this patent is extended or adjusted under 35 U.S.C. 154(b) by 60 days.

This patent is subject to a terminal disclaimer.

(21) Appl. No.: 17/335,326

(22) Filed: Jun. 1, 2021

(65) Prior Publication Data
US 2021/0287186 A1 Sep. 16, 2021

Related U.S. Application Data

(62) Division of application No. 16/009,418, filed on Jun. 15, 2018, now Pat. No. 11,068,860.
(Continued)

(51) Int. Cl.
*G06Q 20/00* (2012.01)
*G06Q 10/30* (2023.01)
(Continued)

(52) U.S. Cl.
CPC .......... *G06Q 10/30* (2013.01); *G06F 3/0482* (2013.01); *G06F 16/27* (2019.01); *G06Q 50/26* (2013.01)

(58) Field of Classification Search
CPC ...... G06Q 10/30; G06Q 50/26; G06F 3/0482; G06F 16/27; Y02W 90/00
(Continued)

(56) References Cited

U.S. PATENT DOCUMENTS 8,296,242 B1 * 10/2012 Bar-Yam ............... G06F 21/335
705/41
9,766,086 B1 * 9/2017 Rodoni .............. G01C 21/3676
(Continued)

FOREIGN PATENT DOCUMENTS

CA          2843087 A1 *  4/2014  ............. G06Q 10/30
CN       104318421 A  *  1/2015  ............. G06Q 10/08
(Continued)

*Primary Examiner* — Russell S Glass
(74) *Attorney, Agent, or Firm* — Cooper Legal Group LLC

(57) ABSTRACT

One or more devices, systems and/or methods for generating waste profiles are provided. For example, a graphical user interface may be controlled to display a waste profile interface. A request to generate a waste profile associated with waste may be received via the waste profile interface. The request may comprise waste parameters of the waste. One or more waste information databases may be analyzed to identify data records associated with the waste parameters. The waste profile may be generated based upon the waste parameters and the data records. An electronic waste transfer request, comprising the waste profile, associated with the waste, may be transmitted over a network connection to a second device associated with a waste facility. An acceptance message indicating that the waste facility accepts the waste or a rejection message indicating that the waste facility rejects the waste may be received from the second device.

20 Claims, 13 Drawing Sheets

Related U.S. Application Data

(60) Provisional application No. 62/519,930, filed on Jun. 15, 2017.

(51) Int. Cl.
 *G06F 16/27* (2019.01)
 *G06F 3/0482* (2013.01)
 *G06Q 50/26* (2012.01)

(58) Field of Classification Search
 USPC .......................................... 705/308
 See application file for complete search history.

(56) References Cited

U.S. PATENT DOCUMENTS

| | | | | |
|---|---|---|---|---|
| 10,628,805 | B2* | 4/2020 | Rodatos | G06Q 10/10 |
| 11,068,860 | B2* | 7/2021 | Collins | G06F 3/0482 |
| 2013/0041832 | A1* | 2/2013 | Rodatos | G06Q 10/30 |
| | | | | 705/308 |
| 2013/0212029 | A1* | 8/2013 | Krejci | G06Q 10/00 |
| | | | | 705/308 |
| 2014/0337191 | A1* | 11/2014 | Senser | G06Q 10/30 |
| | | | | 705/35 |
| 2016/0371738 | A1* | 12/2016 | Berry | G06Q 30/0276 |
| 2016/0377445 | A1* | 12/2016 | Rodoni | G06Q 10/06311 |
| | | | | 701/428 |
| 2017/0109704 | A1* | 4/2017 | Lettieri | G06Q 10/1093 |
| 2017/0118609 | A1* | 4/2017 | Rodoni | B65F 1/14 |
| 2017/0344959 | A1* | 11/2017 | Bostick | H04W 4/021 |
| 2019/0005507 | A1* | 1/2019 | Rodoni | B09B 1/00 |

FOREIGN PATENT DOCUMENTS

| | | | | |
|---|---|---|---|---|
| JP | 3550388 B2 | * | 8/2004 | ............... B65F 3/00 |
| JP | 2005504364 A | * | 2/2005 | ............ G06Q 10/30 |
| KR | 20050115250 A | * | 12/2005 | ............ G06Q 50/26 |
| WO | WO-2015168744 A1 | * | 11/2015 | ......... G06Q 10/0639 |
| WO | WO-2017007913 A1 | * | 1/2017 | ............... B60P 1/00 |

\* cited by examiner

700

| GENERATOR | 702 |

NAME: ──────────────────────────────────────────────
CONTACT: ──────────────── EMAIL: ────────────────────
PHONE: ───────────────── MOBILE: ──────────────── FAX: ──────────────

| MATERIAL ORIGIN | 704 |

ADDRESS: ──────────── CITY: ─────── STATE: ─────── ZIP CODE: ────── COUNTRY: ──────
EPA ID: ──────────────── STATE ID: ──────────────

| DESTINATION FACILITY | 706 |

NAME: ──────────────────────────────────────────────
CONTACT: ──────────────── EMAIL: ────────────────────
PHONE: ───────────────── MOBILE: ──────────────── FAX: ──────────────

| BILLING | 708 |

NAME: ──────────────────────────────────────────────
CONTACT: ──────────────── EMAIL: ────────────────────
PHONE: ───────────────── MOBILE: ──────────────── FAX: ──────────────

| TRANSPORTER | 710 |

TRANSPORTER NAME: ────────────────────────────────────
CONTACT: ──────────────── EMAIL: ────────────────────
PHONE: ───────────────── MOBILE: ──────────────── FAX: ──────────────

| MATERIAL | 712 |

COMMON NAME ──────────────────────────────────────
GENERATION PROCESS ────────────────────────────────
SOURCE OF CONTAMINATION ───────────────────────────
MATERIAL COMPOSITION
   CONSTITUENT ──────────────────────────────── ──%─── TO ──%───
   CONSTITUENT ──────────────────────────────── ──%─── TO ──%───
   CONSTITUENT ──────────────────────────────── ──%─── TO ──%───
STATE WASTE CODES ──────────────────────
COLOR ──────────────
PHYSICAL STATE AT 70°F    SOLID◯    LIQUID◯    SLUDGE◯    DUST◯    OTHER◯
FREE LIQUID RANGE ──%── TO ──%──    PH ───────── TO ────────
STRONG ODOR ────────────────    DESCRIBE ODOR ────────────────
REACTIVITY ────────────────    REACTIVITY EXPLANATION ────────────────
FLASH POINT    <140°F◯    140-199°F◯    >200°F◯    NA◯

| REGULATORY | 714 |

EPA HAZARDOUS WASTE?    YES ◯    NO◯
   IF YES ENTER CHARACTERISTIC WASTE
      CHARACTERISTIC ──────────── PPM (MG/KG) ──────────────
      CHARACTERISTIC ──────────── PPM (MG/KG) ──────────────
      CHARACTERISTIC ──────────── PPM (MG/KG) ──────────────
      LISTED CODES ────────────────────

IS THIS MATERIAL SUBJECT TO THE ALTERNATIVE DEBRIS STANDARDS (40 CFR 268.45)?   YES◯     NO◯

IS THIS MATERIAL SUBJECT TO THE ALTERNATIVE SOIL STANDARDS (40 CFR 268.49)?   YES◯     NO◯
      IF YES, ENTER UNDERLYING HAZARDOUS CONSTITUENT
         CONSTITUENT ────────────────
         CONSTITUENT ────────────────
         CONSTITUENT ────────────────

IS THIS MATERIAL EXEMPT FROM SUBPART CC CONTROLS (40 CFR 264.1083)?   YES◯     NO◯
      IF YES
         WASTE MEETS LDR OR TREATMENT EXEMPTIONS FOR ORGANICS (40 CFR 264.1083 (C) OR (C) (4))◯

IS THIS MATERIAL EXEMPT FROM SUBPART CC CONTROLS (40 CFR 264.1083) ◯

IF NO, ATTACHED NON-HAZARDOUS DETERMINATION DOCUMENT(S) (CHECK ALL THAT APPLY)

☐ PROCESS KNOWLEDGE       PROCESS DETAILS ────────────────
   ☐ SDS

FIG. 7

GENERATING A WASTE PROFILE

RELATED APPLICATION

This application claims priority to and is a divisional of U.S. patent application Ser. No. 16/009,418, titled "GENERATING A WASTE PROFILE" and filed on Jun. 15, 2018, which claims priority to U.S. Provisional Application No. 62/519,930, filed Jun. 15, 2017, which are incorporated herein by reference.

BACKGROUND

A waste generator, such as an industrial factory, a company, a medical facility, etc. may attempt to categorize/characterize waste that is generated (by the waste generator) and/or find a waste facility that can accept the waste. However, information corresponding to the waste may be difficult to access and/or it may be difficult to determine a chemical composition of the waste, a classification of the waste, etc. In order to categorize/characterize the waste and/or find a waste facility that can accept the waste, the waste generator may first need to generate the waste. One or more material safety data sheets (MSDS) and/or one or more safety data sheets (SDS) may be collected (corresponding to each chemical and/or material comprised within the waste). A sample of the waste may (then) be sent to a laboratory for testing to categorize/characterize the waste. The waste generator may (then) need to fill out a waste profile form, attach the one or more MSDSs and/or the one or more SDSs and/or a (lab) analytical to the waste profile form, and send it to waste companies to determine one or more companies that have capabilities for accepting the waste. This process may take a significant amount of time (e.g., weeks and/or months) and it may be costly (e.g., the testing performed at the laboratory may have significant costs). Thus, the waste generator may not be able to schedule transportation of the waste to a waste facility for an extended period of time (while the sample of the waste is being tested, while the waste generator determines which waste facilities have capabilities for accepting the waste, etc.), may need to store the waste for the extended period of time and/or may need to pay the significant costs for the testing performed at the laboratory.

SUMMARY

In accordance with the present disclosure, one or more computing devices, systems, and/or methods are provided. In an example, a graphical user interface of a device may be controlled to display a waste profile interface comprising one or more selectable inputs. A request to generate a waste profile associated with waste may be received. The request may comprise waste parameters of the waste. One or more waste information databases may be analyzed to identify data records associated with the waste parameters. A waste profile associated with the waste may be generated based upon the data records. One or more waste facility information databases, associated with a plurality of waste facilities, may be analyzed based upon the waste profile, to identify a set of waste facilities based upon a determination that each waste facility of the set of waste facilities has previously accepted one or more types of waste associated with the waste profile and/or has capabilities for processing one or more types of waste associated with the waste profile. A list of waste facilities may be generated based upon the set of waste facilities. The list of waste facilities may comprise one or more representations of each waste facility of the set of waste facilities. The graphical user interface of the device may be controlled to display the list of waste facilities. A selection of a first waste facility of the list of waste facilities may be received from the device. Responsive to receiving the selection of the first waste facility, an electronic waste transfer request, associated with the waste, may be transmitted over a network to a second device associated with the first waste facility. The electronic waste transfer request may comprise the waste profile. An acceptance message, comprising an indication that the first waste facility accepts the waste, may be received from the second device. Alternatively, a rejection message, comprising an indication that the first waste facility rejects the waste, may be received from the second device.

In an example, a graphical user interface of a device may be controlled to display a waste profile interface comprising one or more selectable inputs. A request to generate a waste profile associated with waste may be received via the waste profile interface. The request may comprise waste parameters of the waste. One or more waste information databases may be analyzed to identify data records associated with the waste parameters. The waste profile may be generated based upon the waste parameters and the data records. An electronic waste transfer request associated with the waste may be transmitted over a network connection to a second device associated with a waste facility. The electronic waste transfer request may comprise the waste profile. An acceptance message, comprising an indication that the waste facility accepts the waste, may be received from the second device. Alternatively, a rejection message, comprising an indication that the waste facility rejects the waste, may be received from the second device.

In an example, a graphical user interface of a device may be controlled to display a waste profile interface comprising one or more selectable inputs. A request to generate a waste profile associated with waste may be received via the waste profile interface. The request may comprise waste parameters of the waste. The waste parameters may be analyzed to determine a plurality of materials comprised within the waste. One or more waste information databases may be analyzed, based upon the plurality of materials, to identify a plurality of sets of data records. Each set of data records of the plurality of sets of data records may be associated with a material of the plurality of materials. The plurality of sets of data records may be analyzed to determine a plurality of sets of safety-related information. Each set of safety-related information of the plurality of sets of safety-related information may be associated with a material of the plurality of materials. The plurality of sets of safety-related information may be combined to generate a waste data sheet. Waste profile-specific portions of information may be selected from the data records based upon fields of an electronic waste profile form. The waste profile-specific portions of information may be entered into the fields of the electronic waste profile form. The waste profile may be generated based upon the waste data sheet and the electronic waste profile form. A plurality of sets of permit information associated with a plurality of waste facilities may be analyzed, based upon the waste profile, to identify a set of waste facilities based upon a determination that each waste facility of the set of waste facilities is authorized to process one or more types of waste associated with the waste profile. A list of waste facilities may be generated based upon the set of waste facilities. The list of waste facilities may comprise one or more representations of each waste facility of the set of waste facilities. The graphical user interface of the device may be controlled to display the list of waste facilities. A selection of a first waste facility of the list of waste facilities may be received from the device. Responsive to receiving the selection of the first waste facility, an electronic waste transfer request, associated with the waste, may be transmitted over a network to a second device associated with the first waste facility. The electronic waste transfer request may comprise the waste profile. The electronic waste transfer request may be transmitted over the network connection to the second device before the waste is scheduled for transport to the first waste facility. An acceptance message, comprising an indication that the first waste facility accepts the waste, may be received from the second device. Alternatively, a rejection message, comprising an indication that the first waste facility rejects the waste, may be received from the second device.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

FIG. 7 is a component block diagram illustrating an exemplary electronic waste profile form.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

Figure 1:
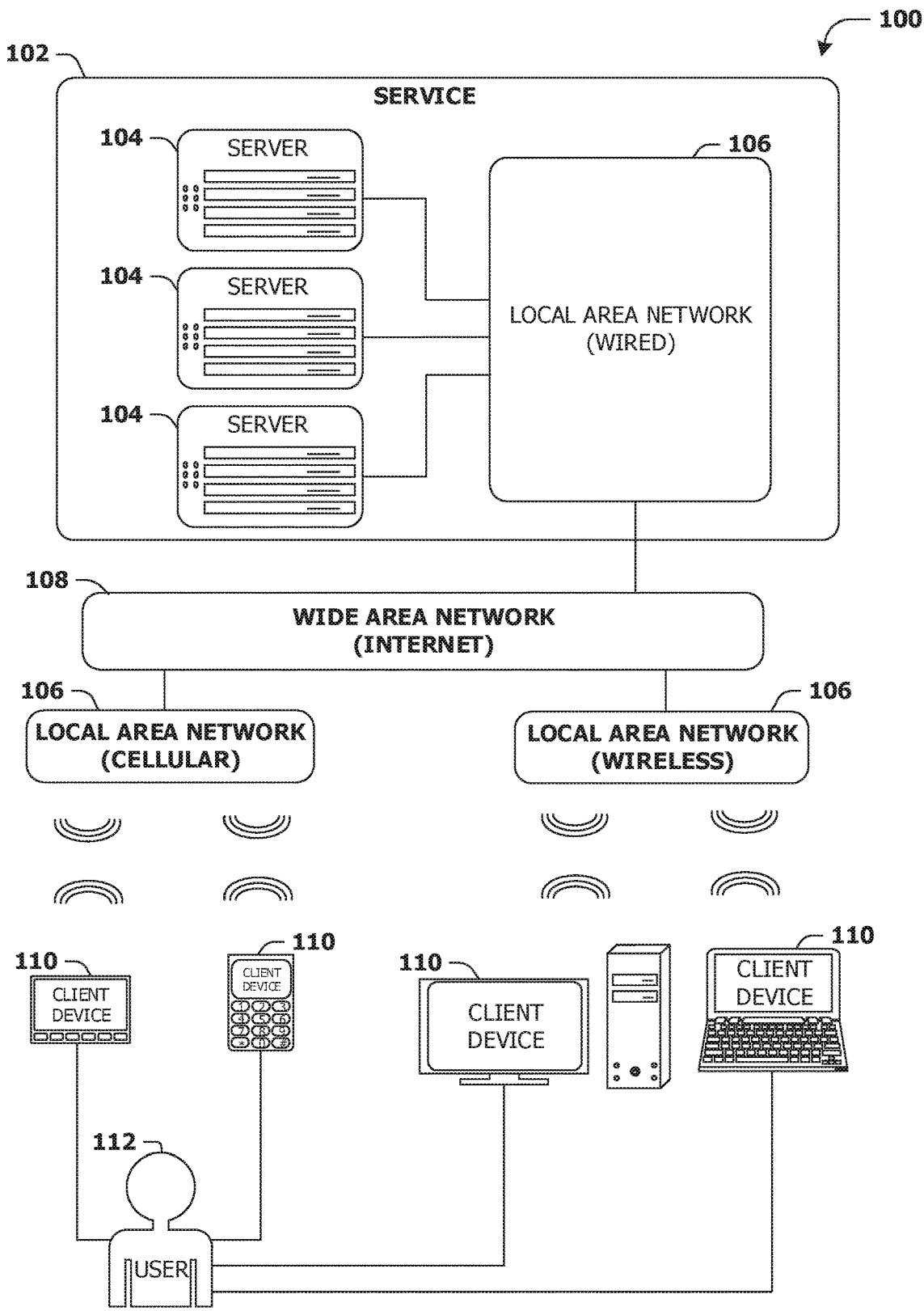
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

In the scenario 100 of FIG. 1, the service 102 may be accessed via a wide area network 108 (WAN) by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108.

One or more client devices 110 may comprise a cellular communicator and may communicate with the service 102 by connecting to the wide area network 108 via a wireless local area network 106 (LAN) provided by a cellular provider.

Alternatively and/or additionally, one or more client devices 110 may communicate with the service 102 by connecting to the wide area network 108 via a wireless local area network 106 provided by a location such as the user's home or workplace. The wireless local area network 106 may, for example, be a WiFi (Institute of Electrical and Electronics Engineers (IEEE) Standard 802.11) network or a Bluetooth (IEEE Standard 802.15.1) personal area network.

It may be appreciated that the servers 104 and the client devices 110 may communicate over various types of networks. Exemplary types of networks that may be accessed by the servers 104 and/or client devices 110 include mass storage, such as network attached storage (NAS), a storage area network (SAN), or other forms of computer or machine readable media.

The servers 104 of the service 102 may be interconnected directly, or through one or more other networking devices, such as routers, switches, and/or repeaters. The servers 104 may utilize a variety of physical networking protocols, such as Ethernet and/or Fiber Channel, and/or logical networking protocols, such as variants of an Internet Protocol (IP), a Transmission Control Protocol (TCP), and/or a User Datagram Protocol (UDP).

The servers 104 of the service 102 may be internally connected via a local area network 106. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

The local area network 106 may be a wired network where network adapters on the respective servers 104 are interconnected via cables (e.g., coaxial and/or fiber optic cabling), and may be connected in various topologies (e.g., buses, token rings, meshes, and/or trees). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art.

Alternatively and/or additionally, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

Figure 2:
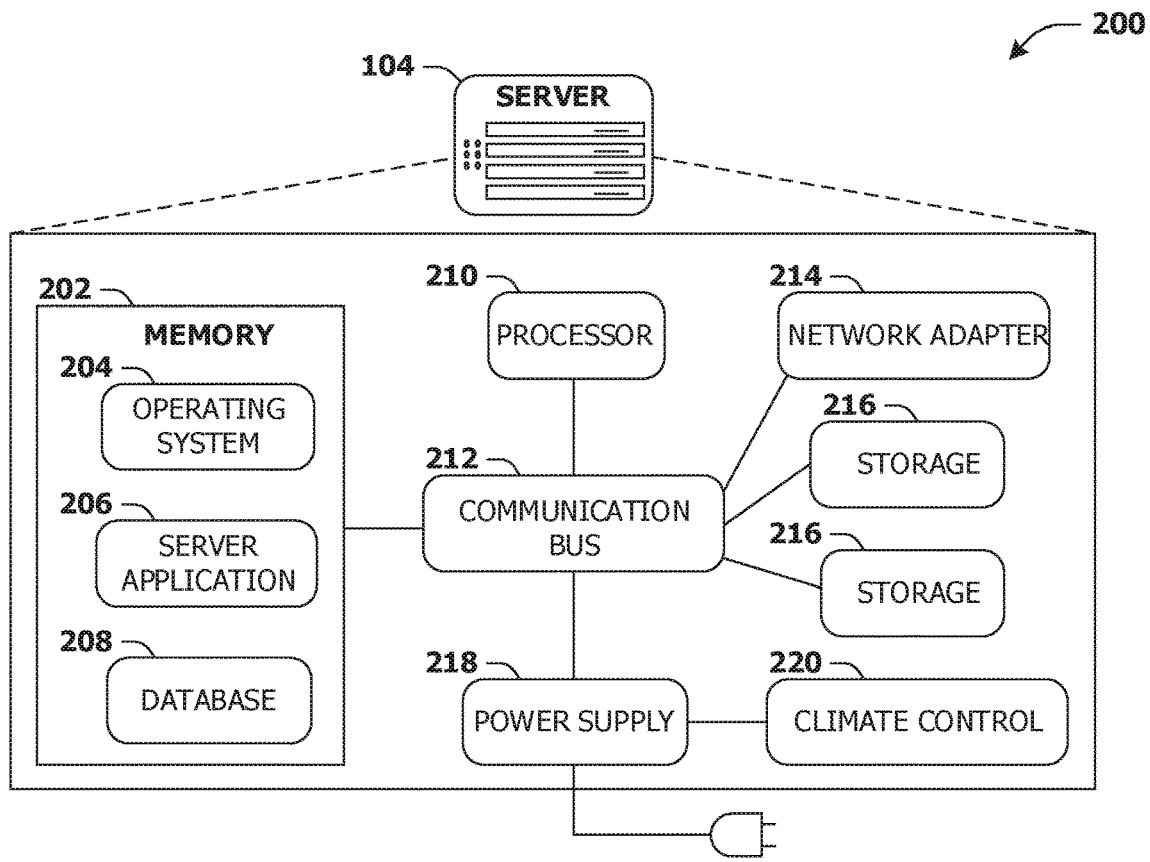
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components.

The server 104 may provide power to and/or receive power from another server and/or other devices. The server 104 may comprise a dedicated and/or shared power supply 218 that supplies and/or regulates power for the other components. The server 104 may comprise a shared and/or dedicated climate control unit 220 that regulates climate properties, such as temperature, humidity, and/or airflow.

The server 104 may include one or more other components that are not shown in the schematic diagram 200 of FIG. 2, such as a display; a display adapter, such as a graphical processing unit (GPU); input peripherals, such as a keyboard and/or mouse; and a flash memory device that may store a basic input/output system (BIOS) routine that facilitates booting the server 104 to a state of readiness. A plurality of such servers 104 may be configured and/or adapted to utilize at least a portion of the techniques presented herein.

Figure 3:
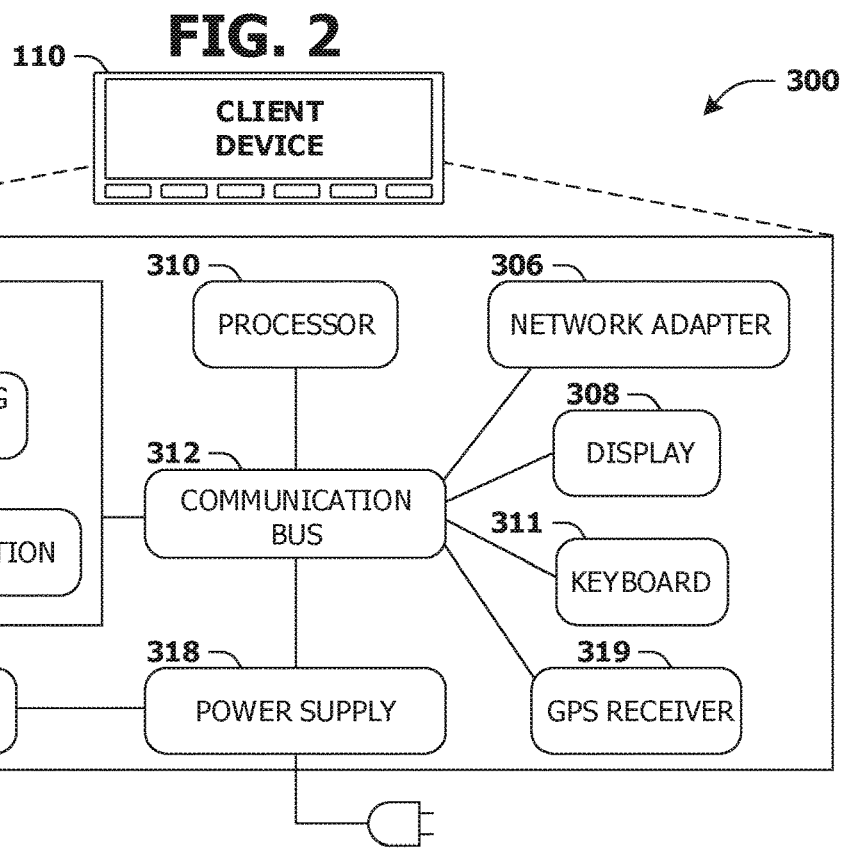
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112.

The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals.

In some examples, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified.

In such examples, descriptive content may be stored, typically along with contextual content. For example, the source of an email address (e.g., a communication received from another user via an instant messenger application) may be stored as contextual content associated with the email address. Contextual content, therefore, may identify circumstances surrounding receipt of an email address (e.g., the date or time that the email address was received), and may be associated with descriptive content. Contextual content, may, for example, be used to subsequently search for associated descriptive content. For example, a search for email addresses received from specific individuals, received via an instant messenger application or at a given date or time, may be initiated.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory.

The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol.

The client device 110 may include one or more other components that are not shown in the schematic architecture diagram 300 of FIG. 3, such as one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness. In some examples, the client device 110 may include a climate control unit that regulates climate properties, such as temperature, humidity, and airflow.

The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

The client device 110 may serve the user in a variety of roles, such as a workstation, kiosk, media player, gaming device, and/or appliance. The client device 110 may therefore be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence.

One or more computing devices, systems, and/or methods are provided for generating a waste profile based upon waste parameters of waste and/or determining waste facilities associated with the waste. In some examples, a waste generator (e.g., a manufacturing plant, a factory, a company, a school, a medical facility, etc.) may generate waste. The waste generator may attempt to determine one or more waste facilities that can dispose of the waste. However, in order to determine whether the one or more waste facilities can dispose of the waste, various characteristics (e.g., one or more materials comprised within the waste, a classification associated with the waste, a flash point associated with the waste, etc.) of the waste need to be determined and/or a waste profile form may need to be completed based upon the various characteristics.

However, information corresponding to the waste may be difficult to access and/or it may be difficult to determine the various characteristics of the waste. For example, in order to determine the various characteristics of the waste using conventional techniques, the waste generator may need to generate the waste. A sample of the waste may be sent to a laboratory for analytical testing to determine the various characteristics. The waste generator may need to complete the waste profile form based upon the various characteristics and send the waste profile form to waste facilities to determine the one or more waste facilities that have capabilities for accepting the waste. This conventional process may take extended periods of time, (wherein the waste generator may need to store the waste for the extended periods of time) and the analytical testing may be costly.

Thus, in accordance with one or more techniques and/or methods provided herein, a graphical user interface of a device associated with the waste generator may be controlled to display one or more selectable inputs associated with waste parameters of the waste and/or user parameters of the waste generator. Waste parameters (e.g., materials comprised within the waste, one or more processes associated with generating the waste, etc.) of the waste may be received via the one or more selectable inputs. One or more waste information databases may be analyzed to identify data records associated with the waste parameters. A waste profile may be generated based upon the data records and/or the waste parameters. For example, waste profile-specific portions of information may be selected from the data records and/or entered into an electronic waste profile form. The waste profile may be transmitted to one or more waste facilities. The waste profile may be transmitted to the one or more waste facilities (for prior authorization for accepting the waste) before the waste is generated and/or before the waste is scheduled for transport. Thus, the waste generator may receive prior authorization before the waste is generated and/or schedule transportation of the waste to a waste facility (before the waste is generated) such that the waste generator does not need to store the waste for any extended period of time.

Figure 4:
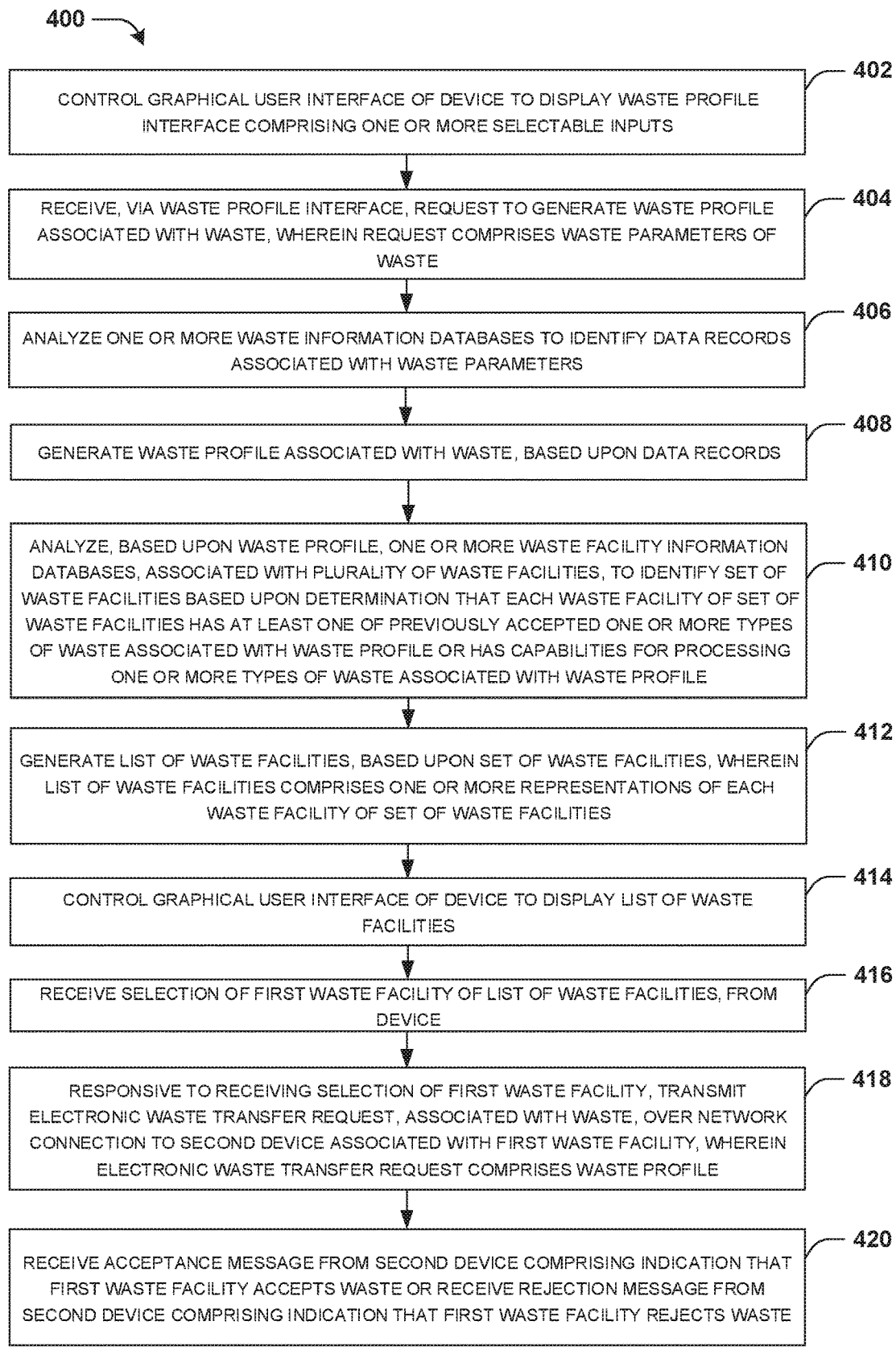
FIG. 4 is a flow chart illustrating an example method for generating a waste profile based upon waste parameters of waste and/or determining waste facilities associated with the waste.

An embodiment of generating a waste profile based upon waste parameters of waste and/or determining waste facilities associated with the waste is illustrated by an example method 400 of FIG. 4. A first user, such as user Jill, (and/or a first device associated with the first user) may access and/or interact with a service, such as a website, an application, etc. that provides a waste profile interface for generating waste profiles based upon (user-defined) waste parameters and/or for viewing, browsing through, searching for, etc. waste facilities. For example, waste facilities may include waste companies (e.g., waste disposal companies, waste treatment companies, etc.) that accept types of waste for storage, processing, treatment, disposal, destruction, recycling and/or reuse. The first user may be associated with a waste generator (e.g., a manufacturing plant, a factory, a company, a school, a medical facility, etc.) that may generate various types of waste.

At 402, a graphical user interface of the first device may be controlled to display the waste profile interface comprising one or more selectable inputs. The one or more selectable inputs may correspond to waste parameters of waste associated with the waste generator. For example, the waste may have (previously) been generated by the waste generator. Alternatively and/or additionally, the waste may currently be in the process of being generated by the waste generator. Alternatively and/or additionally, the waste may not have been generated and/or the waste generator may plan on generating the waste (at a later time).

In some examples, the waste parameters of the waste may be inputted using the one or more selectable inputs. Alternatively and/or additionally, the waste parameters of the waste may be extracted from user account information associated with a user account of the first user with the service (associated with the waste profile interface).

The waste parameters may comprise a material composition associated with the waste (e.g., one or more materials comprised within the waste) and/or one or more processes associated with (generating) the waste. Alternatively and/or additionally, the waste parameters may comprise one or more safety data sheets (SDS) associated with the waste, one or more material safety data sheets (MSDS) associated with each material of the one or more materials, one or more product safety data sheets (PSDS) associated with the waste and/or one or more product data sheets (PDS) associated with the waste. For example, the one or more SDSs, the one or more MSDSs, the one or more PSDSs and/or the one or more PDSs may be uploaded (to one or more servers associated with the service) using the waste profile interface (and/or the one or more selectable inputs). Alternatively and/or additionally, the waste parameters may comprise a location of the waste generator, a location of the waste, contact information associated with the waste generator, billing information, etc.

At 404, a request to generate a waste profile associated with the waste may be received. For example, the request may be received using the waste profile interface (and/or via a selection of the one or more selectable inputs). The request may comprise the waste parameters (of the waste). At 406, one or more waste information databases may be analyzed to identify data records associated with the waste parameters.

In some examples, the one or more waste information databases may be stored on the one or more servers associated with the service (and/or one or more second servers connected to the one or more servers via a network connection). For example, the one or more waste information databases may be maintained and/or updated by the service, based upon information comprised within a plurality of waste-related databases. In some examples, the plurality of waste information databases may comprise public databases and/or private (e.g., and/or payment based) databases. For example, the service may (e.g., autonomously) mine and/or access the plurality of waste-related databases. In some examples, each of the plurality of waste-related databases may be externally verified (e.g., by an independent third party). A plurality of networks and/or a plurality of domains may be mined and/or accessed (e.g., autonomously) by the service. In some examples, the plurality of networks may comprise public networks and/or private (e.g., and/or payment based) networks. In some examples, the plurality of domains may comprise public domains and/or private (e.g., and/or payment based) domains. The plurality of waste-related databases, the plurality of networks and/or the plurality of domains may comprise waste information associated with various types of waste, waste generators, waste facilities, waste services, safety-related information associated with waste and/or materials, regulatory information associated with waste and/or materials, classifications of various types of waste and/or materials, etc. In some examples, information associated with waste may be extracted from the plurality of waste-related databases and/or may be added to and/or stored in the one or more waste information databases (automatically).

In some examples, the one or more waste information databases may comprise waste information associated with a plurality of materials (e.g., materials comprised within various types of waste). For example, the one or more waste information databases may comprise classifications of various types of waste and/or materials, regulatory information associated with waste, hazard codes associated with various types of waste and/or materials, etc. In some examples, the one or more waste information databases may comprise a data structure comprising a plurality of sets of information. For example, each set of information of the plurality of sets of information may correspond to a material of the plurality of sets of materials.

In some examples, each set of information of the plurality of sets of information may comprise characteristics of a material of the plurality of materials, such as a name of the material, one or more waste codes associated with the material, one or more regulations associated with the material, one or more hazardous characteristics of the material, one or more hazard codes associated with the material, one or more reactivity properties of the material, a flash point associated with the material, one or more colors of the material, one or more physical properties of the material (viscosity, physical state, etc.), one or more free liquid ranges associated with the material, one or more carcinogenic properties of the material, one or more infectious properties associated with the material, one or more halogen properties associated with the material, and/or one or more (other) characteristics associated with the material.

Alternatively and/or additionally, the one or more waste information databases may comprise waste information associated with a plurality of processes (e.g., processes associated with generating various types of waste). For example, the one or more waste information databases may comprise classifications of various types of processes (and/or classifications of combinations of the various types of processes with various types of waste and/or various types of materials), regulatory information associated with various types of processes, hazard codes associated with various types of processes, etc. In some examples, the one or more waste information databases may comprise a second data structure comprising a second plurality of sets of information. For example, each set of information of the second plurality of sets of information may correspond to a process of the plurality of sets of processes.

In some examples, each set of information of the second plurality of sets of information may comprise characteristics of a process of the plurality of processes, such as a classification of the process (and/or one or more classifications of combinations of the process with various types of waste), a name of the process, one or more waste codes associated with the process, one or more regulations associated with the process, one or more hazardous characteristics associated with the process, one or more hazard codes associated with the process, and/or one or more (other) characteristics associated with the process.

In some examples, the one or more waste information databases may comprise a waste safety-related information database. For example, the waste safety-related database may comprise a plurality of sets of safety-related information associated with the plurality of materials. Each set of safety-related information of the plurality of sets of safety-related information may correspond to a material of the plurality of materials. For example, each set of safety-related information of the plurality of sets of safety-related information may comprise one or more SDSs associated with a material of the plurality of materials, one or more MSDSs associated with the material, one or more PSDSs associated with the material and/or one or more PDSs associated with the material.

In some examples, the data records (identified from the one or more waste information databases) may be identified based upon a determination that (each of) the data records are associated with the waste. For example, the data records may be identified based upon a determination that (each of) the data records are associated with the one or more materials (comprised within the waste) and/or the one or more processes associated with (generating) the waste. Alternatively and/or additionally, one or more sets of safety-related information may be identified (from the plurality of sets of safety-related information), based upon a determination that the one or more sets of safety-related information are associated with the one or more materials comprised within the waste and/or the one or more processes associated with (generating) the waste.

In some examples, the data records may comprise a set of material-related characteristics associated with the one or more materials comprised within the waste, a set of process-related characteristics associated with the one or more processes associated with (generating) the waste and/or the one or more sets of safety-related information corresponding to the one or more materials comprised within the waste. In some examples, the one or more sets of safety-related information (and/or the data records) may comprise one or more SDSs associated with the one or more materials, one or more MSDSs associated with the one or more materials, one or more PSDSs associated with the one or more materials and/or one or more PDSs associated with the one or more materials.

In some examples, the set of material-related characteristics may comprise one or more names of the one or more materials (comprised within the waste), one or more waste codes associated with the one or more materials, one or more regulations associated with the one or more materials, one or more hazardous characteristics of the one or more materials, one or more hazard codes associated with the one or more materials, one or more reactivity properties of the one or more materials, one or more colors of the one or more materials, one or more odors of the one or more materials, one or more physical properties of the one or more materials, one or more free liquid ranges associated with the one or more materials, one or more carcinogenic properties of the one or more materials, one or more infectious properties associated with the one or more materials, one or more halogen properties associated with the one or more materials, and/or one or more (other) characteristics associated with the one or more materials.

Alternatively and/or additionally, the set of process-related characteristics may comprise one or more classifications of the one or more processes (and/or one or more classifications of combinations of the one or more processes with the one or more materials), one or more waste codes associated with the one or more processes, one or more regulations associated with the one or more types of processes, one or more hazard codes associated with the one or more processes, and/or one or more (other) characteristics associated with the one or more processes.

At 408, a waste profile, associated with the waste, may be generated based upon the data records (and/or the waste parameters). For example, the waste profile may be generated based upon the first set of characteristics, the second set of characteristics, the one or more sets of safety-related information and/or the waste parameters. For example, at least a portion of the waste profile may be generated by populating (e.g., automatically entering information into) an electronic waste profile form associated with the waste profile using one or more algorithmic techniques and/or one or more (other types of) techniques.

In some examples, the electronic waste profile form may be a (generic) form associated with all (and/or most, some, etc.) types of waste. Alternatively and/or additionally, the electronic waste profile form may be generated and/or modified based upon the waste parameters and/or the data records. For example, the electronic waste profile form may be generated and/or modified based upon the location of the waste (and/or the location of the waste generator), governing regulations and/or laws associated with the waste, the one or more materials and/or the one or more processes.

In some examples, the electronic waste profile form may comprise a plurality of (input) fields associated with information sets associated with parameters of the waste generator (e.g., the location of the waste generator, the contact information associated with the waste generator, the billing information, etc.), characteristics of the waste, characteristics of the one or more materials, and/or characteristics of the one or more processes.

For example, the data records may be analyzed to select waste profile-specific portions of information based upon the plurality of fields of the electronic waste profile form. For example, each waste profile-specific portion of information of the waste profile-specific portions of information may comprise information corresponding to a field of the plurality of fields. The waste profile-specific portions of information may be extracted (from the data records) and/or entered into the electronic waste profile form. For example, the waste profile-specific portions of information may be formatted based upon a format associated with the electronic waste profile form to generate a plurality of formatted portions of information. Each formatted portion of information of the plurality of formatted portions of information may correspond to a field of the plurality of fields. For example, the plurality of formatted portions of information may be entered into (the plurality of fields of) the electronic waste profile form (using one or more algorithmic techniques and/or other one or more other techniques).

Alternatively and/or additionally, the waste profile-specific portions of information may be modified (using one or more algorithmic techniques and/or one or more other techniques) based upon the waste parameters to generate a plurality of modified portions of information. Each modified portion of information of the plurality of modified portions of information may correspond to a field of the plurality of fields. For example, the plurality of modified portions of information may be entered into (the plurality of fields of) the electronic waste profile form.

In some examples, the waste parameters may indicate that the one or more materials comprised within the waste may comprise a plurality of materials (e.g., two or more materials). For example, the data records may comprise a first plurality of sets of data records. Each set of data records of the first plurality of sets of data records may correspond to a material of the plurality of materials.

In a first example, the plurality of materials may comprise (e.g., two materials comprising) a first material and a second material. In a first example, a first waste profile-specific portion of information corresponding to the first material may be extracted from a first set of data records (of the first plurality of sets of data records) corresponding to the first material. A second waste profile-specific portion of information corresponding to the second material may be extracted from a second set of data records (of the first plurality of sets of data records) corresponding to the second material. The first waste profile-specific portion of information and the second waste profile-specific portion of information may be analyzed, modified and/or combined (using one or more algorithmic techniques and/or one or more other techniques) to generate a modified portion of information corresponding to the waste. For example, the first waste-profile specific portion of information may comprise an indication of a first color of the first material. The second waste-profile specific portion of information may comprise an indication of a second color of the second material. The indication of the first color and/or the indication of the second color may be analyzed to generate the modified portion of information comprising an indication of a third color corresponding to the waste. The modified portion of information may be entered into a field of the plurality of fields of the electronic waste profile form.

In a second example, a third waste profile-specific portion of information corresponding to the first material may be extracted from the first set of data records. A fourth waste profile-specific portion of information corresponding to the second material may be extracted from the second set of data records. The third waste profile-specific portion of information and the fourth waste profile-specific portion of information may be analyzed, modified and//or combined to generate a second modified portion of information corresponding to the waste. For example, the third waste profile-specific portion of information may comprise a first waste code (e.g., a state waste code, a federal waste code, an international waste code, a waste code associated with a regulatory agency, etc.) associated with the first material. The fourth waste profile-specific portion of information may comprise a second waste code associated with the second material. The first waste code and/or the second waste code may be analyzed and/or combined (e.g., using one or more algorithmic techniques and/or one or more other techniques) to generate the second modified portion of information comprising indications of (both of) the first waste code and the second waste code corresponding to (the first material and the second material of) the waste.

Alternatively and/or additionally, the one or more sets of safety-related information corresponding to the one or materials may comprise a first set of safety-related information corresponding to the first material and a second set of safety-related information corresponding to the second material. In some examples, the first set of safety-related information may comprise a first SDS associated with the first material, a first MSDS associated with the first material, a first PSDS associated with the first material and/or a first PDS associated with the first material. Alternatively and/or additionally, the second set of safety-related information may comprise a second SDS associated with the second material, a second MSDS associated with the second material, a second PSDS associated with the second material and/or a second PDS associated with the second material. In some examples, the first set of safety-related information may be combined with the second set of safety-related information (using one or more algorithmic techniques and/or one or more other types of techniques) to generate a waste data sheet corresponding to the waste. For example, the waste data sheet may comprise waste-specific safety-related information associated with the waste. In some examples, the waste data sheet may be used to populate the electronic waste profile form. Alternatively and/or additionally, the waste profile may comprise the electronic waste profile form and the waste data sheet.

In some examples, the waste may be classified based upon the waste parameters and/or the data records to generate one or more classifications of the waste. For example, the one or more classifications of the waste may comprise one or more state waste codes, one or more federal waste codes, one or more international waste codes, one or more international waste codes, one or more waste codes associated with a regulatory agency, one or more indications of whether the waste is hazardous, one or more hazard codes, one or more indications of regulatory information, one or more indications of governing laws that the waste is subject to, one or more indications of standards (e.g., alternative DEBRIS standards, alternative SOIL standards, etc.) that the waste is subject to, one or more exemptions associated with the waste, one or more jurisdictions associated with the waste, and/or one or more other (types of) classifications. In some examples, the waste may be classified based upon the one or more materials and/or the one or more processes. In some examples, the waste profile may comprise the one or more classifications of the waste.

At 410, one or more waste facility information databases may be analyzed based upon the waste profile, to identify a set of waste facilities from a plurality of waste facilities associated with the one or more waste facility information databases. For example, the one or more waste facility information databases may be stored on the one or more servers associated with the service (and/or one or more third servers connected to the one or more servers via a network connection). For example, the one or more waste facility databases may be maintained and/or updated by the service, based upon information comprised within a second plurality of waste-related databases. In some examples, the second plurality of waste-related databases may comprise the plurality of waste-related databases.

Alternatively and/or additionally, the one or more waste facility information databases may be maintained and/or updated by the service by storing a plurality of electronic waste transfer requests (comprising a plurality of waste profiles) transmitted to the plurality of waste facilities (using the service). For example, a plurality of users associated with waste generators may use the service to transmit the plurality of electronic waste transfer requests to the plurality of waste facilities.

Alternatively and/or additionally, the one or more waste facility information databases may be maintained and/or updated by the service by storing (information associated with) a plurality of acceptance messages, associated with the plurality of electronic waste transfer requests, received from the plurality of waste facilities. For example, each acceptance message of the plurality of acceptance messages may indicate that a type of waste associated with an electronic waste transfer request of the plurality of electronic waste transfer requests was accepted by a waste facility of the plurality of facilities. For example, the one or more waste facility information databases may comprise a first plurality of sets of historical records associated with the plurality of waste facilities. Each set of historical records of the first plurality of sets of historical records may correspond to types of waste that a waste facility of the plurality of waste facilities has previously accepted. For example, each set of historical records of the first plurality of sets of historical records may be determined based upon a set of acceptance messages (of the plurality of acceptance messages) transmitted by a waste facility of the plurality of waste facilities.

In some examples, the first plurality of sets of historical records associated with the plurality of waste facilities may be analyzed (e.g., using one or more algorithmic techniques and/or one or more other techniques) based upon the waste profile. For example, the set of waste facilities may be identified based upon a determination that each waste facility of the set of waste facilities has previously accepted one or more types of waste associated with the waste profile.

Alternatively and/or additionally, the one or more waste facility information databases may be maintained and/or updated by the service by storing (information associated with) a plurality of rejection messages, associated with the plurality of electronic waste transfer requests, received from the plurality of waste facilities. For example, each rejection message of the plurality of rejection messages may indicate that (waste associated with) an electronic waste transfer request of the plurality of electronic waste transfer requests was rejected by a waste facility of the plurality of waste facilities. For example, the one or more waste facility information databases may comprise a second plurality of sets of historical records associated with the plurality of waste facilities. Each set of historical records of the second plurality of sets of historical records may correspond to types of waste that a waste facility of the plurality of waste facilities has previously rejected. For example, each set of historical records of the second plurality of sets of historical records may be determined based upon a set of rejection messages (of the plurality of rejection messages) transmitted by a waste facility of the plurality of waste facilities.

In some examples, the second plurality of sets of historical records associated with the plurality of waste facilities may be analyzed (e.g., using one or more algorithmic techniques and/or one or more other techniques) based upon the waste profile. For example, the set of waste facilities may be identified based upon a determination that each waste facility of the set of waste facilities has not previously rejected one or more types of waste associated with the waste profile.

Alternatively and/or additionally, the one or more waste facility information databases may be maintained and/or updated by storing user account information of each waste facility of the plurality of waste facilities. For example, the one or more waste facility information databases may comprise a plurality of sets of user account information. Each set of user account information of the plurality of sets of user account information may comprise (user-defined) capabilities of a waste facility of the plurality of waste facilities (e.g., types of waste that the waste facility can process, dispose of, recycle, etc.), services offered by the waste facility, a location of the waste facility, contact information associated with the waste facility, billing information associated with the waste facility, etc.

In some examples, the plurality of sets of user account information associated with the plurality of waste facilities may be analyzed (e.g., using one or more algorithmic techniques and/or one or more other techniques) based upon the waste profile. For example, the set of waste facilities may be identified based upon a determination that each waste facility of the set of waste facilities has capabilities for processing one or more types of waste associated with the waste profile. Alternatively and/or additionally, the set of waste facilities may be identified based upon a determination that each waste facility of the set of waste facilities is located within a maximum distance from the location of the waste generator.

Alternatively and/or additionally, the one or more waste facility information databases may comprise a plurality of sets of permit information associated with the plurality of waste facilities. For example, each set of permit information of the plurality of sets of permit information corresponds to a waste facility of the plurality of waste facilities. In some examples each set of permit information of the plurality of sets of permit information may comprise indications of one or more types of waste that a waste facility of the plurality of waste facilities is authorized to receive, process, dispose of, etc. For example, each set of permit information of the plurality of sets of permit information may comprise one or more indications of a city permit, a state permit, a federal permit, an Environmental Protection Agency (EPA) permit, an international permit, etc. In some examples, the plurality of sets of permit information may be comprised within the plurality of sets of user account information. Alternatively and/or additionally, the plurality of sets of permit information may be extracted from one or more permit information databases.

In some examples, the plurality of sets of permit information associated with the plurality of waste facilities may be analyzed (e.g., using one or more algorithmic techniques and/or one or more other techniques) based upon the waste profile. For example, the set of waste facilities may be identified based upon a determination that each waste facility of the set of waste facilities corresponds to a set of permit information that matches the waste profile and/or the one or more classifications of the waste. Alternatively and/or additionally, the set of waste facilities may be identified based upon a determination that each waste facility of the set of waste facilities is authorized to receive, process, dispose of, etc. one or more types of waste associated with the waste profile.

At 412, a list of waste facilities may be generated based upon the set of waste facilities. For example, the list of waste facilities may comprise one or more representations of each waste facility of the set of waste facilities. In some examples, the list of waste facilities may comprise a plurality of selectable inputs. For example, each selectable input may correspond to a waste facility of the set of waste facilities. For example, each selectable input may comprise a name of a company (of a waste facility), a location, a rating of the company, financial requirements (e.g., cost, payment schedule, etc.), parameters for disposal of waste, services provided, and/or one or more types of waste accepted for processing, treatment, disposal, destruction, recycling and/or reuse.

At 414, the graphical user interface of the first device may be controlled to display the list of waste facilities. At 416, a selection of a first waste facility of the list of waste facilities may be received from the first device. At 418, responsive to receiving the selection of the first waste facility, an electronic waste transfer request, associated with the waste, may be transmitted over a network connection to a second device associated with the first waste facility. In some examples, the electronic waste transfer request may comprise the waste profile.

In some examples, the electronic waste transfer request and/or the waste profile may be displayed using the second device responsive to a second user associated with the second device (e.g., the second user may be associated with the first waste facility) accessing the service using the second device (e.g., a second user account of the service associated with the first waste facility may be accessed and/or logged into using the second device). Alternatively and/or additionally, the electronic waste transfer request may be transmitted (to the second device) via email, a messaging interface, etc. The first waste facility may accept the waste (and/or proceed to schedule transportation of the waste to the first waste facility from the waste generator) based upon capabilities of the first waste facility, available space for the waste at the first waste facility, etc. Alternatively, the first waste facility may reject the waste (e.g., the first waste facility may not have capabilities for receiving, processing, disposing of, etc. the waste).

At 420, an acceptance message may be received from the second device comprising an indication that the first waste facility accepts the waste. Accordingly, shipping documents, regulatory documents, etc. associated with transporting the waste to the first waste facility may be generated (e.g., electronic shipping forms, electronic regulatory forms, etc. may be populated automatically using the service) based upon the waste profile and/or the waste data sheet (comprised within the waste profile). Alternatively and/or additionally, one or more of the waste profile, the waste data sheet, the shipping documents, the regulatory documents, etc. may be transmitted to regulatory authorities (as needed based upon governing laws and/or regulations associated with the waste). Transportation of the waste from the waste generator to the first waste facility may be scheduled and/or facilitated (using the service). In some examples, the electronic waste transfer request, the waste profile, the acceptance message, etc. may be stored in the one or more waste information databases and/or the one or more waste facility information databases.

In some examples, a safety document may be generated comprising at least a portion of the waste profile. For example, the safety document may comprise the waste data sheet. The safety document may comprise safety-related information such as spill-handling instructions associated with the waste, safety hazards associated with the waste, transportation instructions associated with the waste, evacuation instructions associated with emergency situations, etc. In some examples, the safety document may be transmitted to the first device. For example, the safety document may be printed and/or coupled to a container holding the waste during transport to the first waste facility (and/or a different waste facility). Alternatively and/or additionally, the safety document may be placed within a transportation vehicle transporting the waste to the first waste facility (and/or a different waste facility). For example, the safety document may be placed under the care of a driver of the transportation vehicle. Alternatively and/or additionally, the safety document may be transferred to an electronic storage device (e.g., a radio frequency identification (RFID) tag and/or a different type of electronic storage device). The electronic storage device may be coupled to the container holding the waste and/or may be placed within the transportation vehicle. For example, in a case of a waste-related emergency (e.g., a spill associated with the waste, a driving accident, the waste being exposed to extreme conditions, etc.) the driver and/or emergency personnel (e.g., first responders) may determine, based upon the safety document, steps to take to respond to the waste-related emergency.

Alternatively, at 420, a rejection message may be received from the second device comprising an indication that the first waste facility rejects the waste. For example, the second user may determine that the first waste facility may not have space for receiving, processing, disposing of, etc. the waste, that the first waste facility may not have capabilities for receiving, processing, disposing of, etc. the waste, etc.

In some examples, the graphical user interface of the first device (and/or a third graphical user interface of a third device associated with the first user and/or the waste generator) may be controlled to display the acceptance message or the rejection message. For example, the user account of the first user with the service (and/or a third user account of a third user associated with the waste generator) may be accessed. Responsive to accessing the user account (and/or the third user account), one or more indications of the acceptance message or the rejection message may be displayed via the first device (and/or the third device).

In some examples, (merely) the waste profile and/or the waste data sheet may be generated using the waste profile interface (rather than generating the list of waste facilities based upon the waste profile). For example, the waste profile and/or the waste data sheet may be downloaded using the first device (and/or the third device). The waste profile and/or the waste data sheet may (then) be sent to one or more waste facilities (e.g., electronic copies may be transmitted electronically, printed copies may be sent by mail, etc.) by the first device (e.g., and/or the first user). Alternatively and/or additionally, the waste profile and/or the waste data sheet may be used for (future) instances of waste generation of types of waste associated with the waste. Alternatively and/or additionally, the waste profile and/or the waste data sheet may be submitted to regulatory authorities.

In some examples, the waste profile may be generated, the electronic waste transfer request may be transmitted to the first waste facility before the waste is generated and/or before the waste is scheduled for transport to the first waste facility. For example, the waste generator may receive prior-authorization from the first waste facility (e.g., the acceptance message) to transport the waste to the first waste facility. Further, the waste generator and/or the first waste facility may schedule for transporting the waste to the first waste facility prior to generation of the waste (and/or prior to a threshold amount of the waste being generated). For example, the transportation of the waste to the first waste facility may be scheduled for a time that the waste generator predicts that the threshold amount of the waste will be generated. Accordingly, upon generation of the threshold amount of the waste, the waste may be transported to the first waste facility (e.g., without delay, without storing the waste for extended periods of time, etc.).

FIGS. 5A-5G illustrate examples of a system 501 for generating a waste profile based upon waste parameters of waste and/or determining waste facilities associated with the waste. A first user, such as user Jake, (e.g., and/or a first device 500 associated with the first user) may access and/or interact with a service, such as a website, an application, etc. that provides a waste profile interface for generating waste profiles based upon (user-defined) waste parameters and/or for viewing, browsing through, searching for, etc. waste facilities. For example, waste facilities may include waste companies (e.g., waste disposal companies, waste treatment companies, etc.) that accept types of waste for storage, processing, treatment, disposal, destruction, recycling and/ or reuse. The first user may be associated with a waste generator (e.g., a manufacturing plant, a factory, a company, a school, a medical facility, etc.) that may generate various types of waste.

Figure 5A:
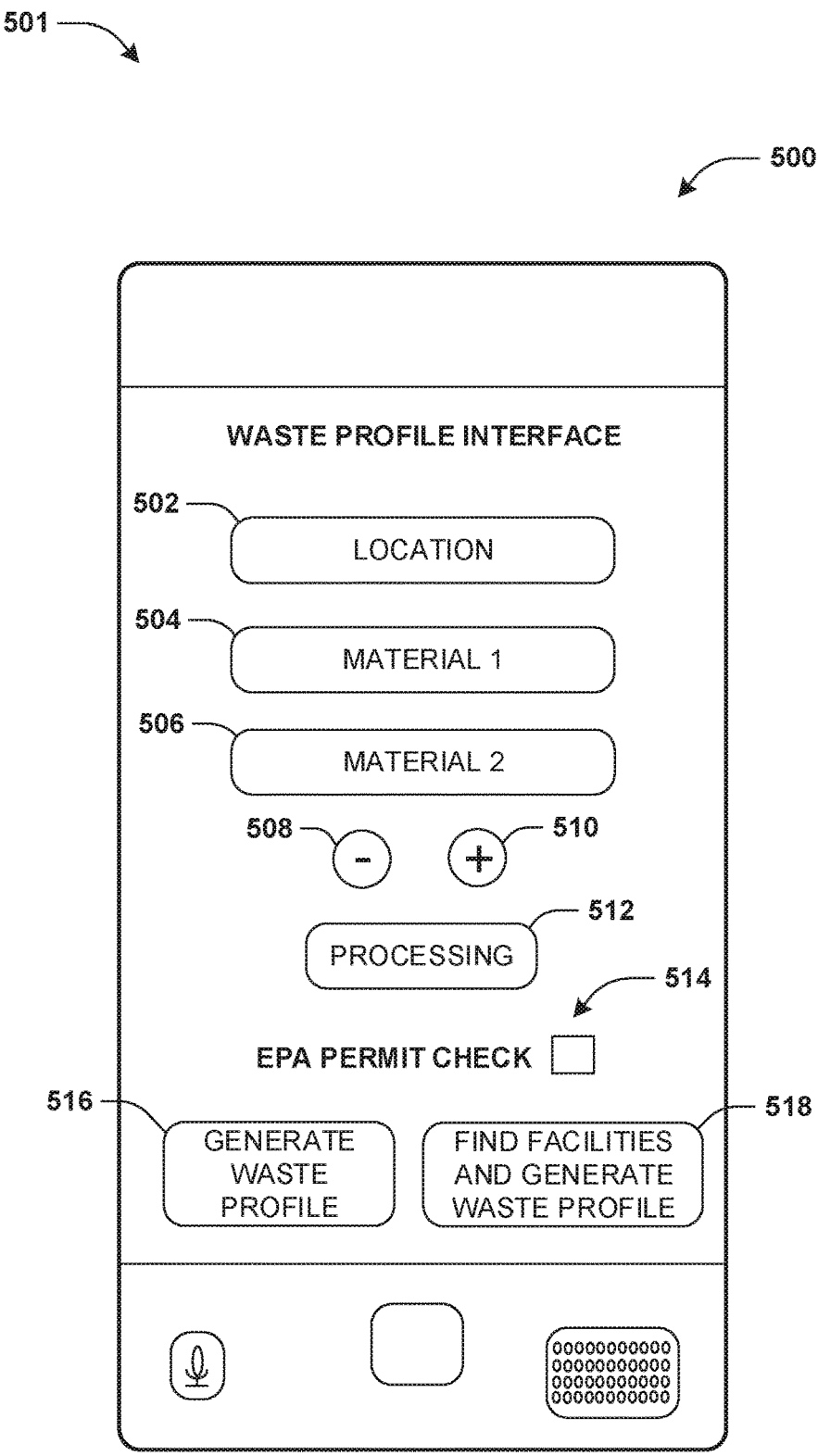
FIG. 5A is a component block diagram illustrating an example system for generating a waste profile based upon waste parameters of waste and/or determining waste facilities associated with the waste, where a graphical user interface of a first device is being controlled to display a waste profile interface comprising a plurality of selectable inputs.

FIG. 5A illustrates a graphical user interface of the first device 500 being controlled to display the waste profile interface comprising a plurality of selectable inputs. The plurality of selectable inputs may correspond to waste parameters of waste associated with the waste generator. In some examples, the plurality of selectable inputs may comprise a first selectable input 502, a second selectable input 504, a third selectable input 506, a fourth selectable input 508, a fifth selectable input 510 and/or a sixth selectable input 512.

For example, the first selectable input 502 may correspond to a location of the waste. Alternatively and/or additionally, the second selectable input 504 may correspond to a first material of the waste. The third selectable input 506 may correspond to a second material of the waste. Alternatively and/or additionally, the fourth selectable input 508 may correspond to removing one or more materials (from the waste parameters). The fifth selectable input 510 may correspond to adding one or more materials (to the waste parameters). Alternatively and/or additionally, the sixth selectable input 512 may correspond to one or more processes associated with (generating) the waste. In some examples, the waste parameters of the waste may be inputted using the plurality of selectable inputs.

Alternatively and/or additionally, the waste profile interface may display a seventh selectable input 514. The seventh selectable input 514 "EPA PERMIT CHECK" may correspond to generating a list of waste facilities based upon a determination that each waste facility of the list of waste facilities is authorized to receive, process, dispose of, etc. the waste. Alternatively and/or additionally, the waste profile interface may display an eighth selectable input 516. The eighth selectable input 516 may correspond to (merely) generating a waste profile associated with the waste parameters (without generating the list of waste facilities). Alternatively and/or additionally, the waste profile interface may display a ninth selectable input 518. The ninth selectable input 518 may correspond to generating the waste profile (associated with the waste parameters) and generating the list of waste facilities (based upon the waste profile). In some examples, a selection of the ninth selectable input 518 may be received.

Figure 5B:
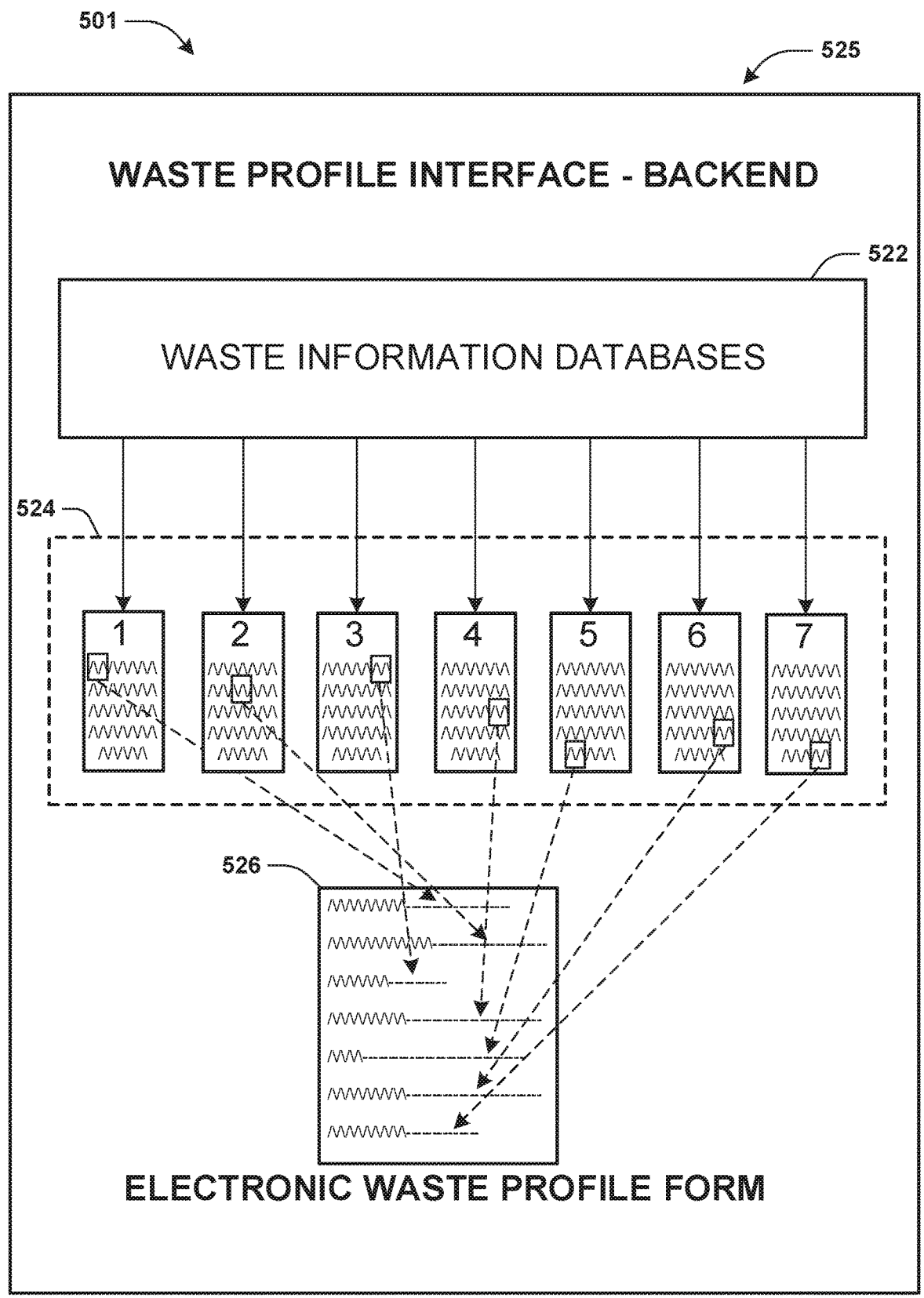
FIG. 5B is a component block diagram illustrating an example system for generating a waste profile based upon waste parameters of waste and/or determining waste facilities associated with the waste, where a graphical user interface is backend system generates a waste profile based upon waste parameters.

FIG. 5B illustrates a backend system 525 (e.g., on one or more servers 548 of the service associated with the waste profile interface) that may generate a waste profile based upon the waste parameters. For example, one or more waste information databases 522 may be analyzed to identify a plurality of data records 524 associated with the waste parameters. A waste profile may be generated based upon the plurality of data records 524. For example, at least a portion of the waste profile may be generated by populating (e.g., automatically entering information into) an electronic waste profile form 526 associated with the waste profile (using one or more algorithmic techniques and/or one or more other techniques). For example, the plurality of data records 524 may be analyzed to select waste profile-specific portions of information based upon a plurality of fields of the electronic waste profile form 526. For example, each profile-specific portion of information of the waste profile-specific portions of information may comprise information corresponding to a field of the plurality of fields. The waste profile-specific portions of information may be extracted (from the plurality of data records 524) and/or entered into the electronic waste profile form 526. Each waste profile-specific portion of information of the waste profile-specific portions of information may be formatted, modified and/or combined with a separate waste profile-specific portion of information prior to being entered into a field of the plurality of fields (of the electronic waste profile form 526).

In some examples, one or more waste facility information databases may be analyzed based upon the waste profile, to identify a set of waste facilities from a plurality of waste facilities associated with the one or more waste facility information databases. Alternatively and/or additionally, a list of waste facilities may be generated based upon the set of waste facilities. For example, the list of waste facilities may comprise one or more representations of each waste facility of the set of waste facilities.

Figure 5C:
FIG. 5C is a component block diagram illustrating an example system for generating a waste profile based upon waste parameters of waste and/or determining waste facilities associated with the waste, where a graphical user interface of a first device is being controlled to display a list of waste facilities.

FIG. 5C illustrates the graphical user interface of the first device 500 being controlled to display the list of waste facilities (via the waste profile interface). For example, the list of waste facilities may comprise a tenth selectable input 532 corresponding to a first waste facility of the list of waste facilities, an eleventh selectable input 534 corresponding to a second waste facility of the list of waste facilities, a twelfth selectable input 536 corresponding to a third waste facility of the list of waste facilities, etc. The waste profile interface may provide for browsing through, searching for, etc. waste facilities of the list of waste facilities. In some examples, a selection of the tenth selectable input 532 (corresponding to the first waste facility) may be received.

Figure 5D:
FIG. 5D is a component block diagram illustrating an example system for generating a waste profile based upon waste parameters of waste and/or determining waste facilities associated with the waste, where a graphical user interface of a first device is being controlled to display waste facility information associated with a first waste facility.

FIG. 5D illustrates the graphical user interface of the first device 500 being controlled to display waste facility information associated with the first waste facility (via the waste profile interface). In some examples, the waste facility information may comprise a logo associated with the first waste facility, a location associated with the first waste facility, a price associated with receiving, processing, disposing of, etc. the waste, and/or services offered by the first waste facility. In some examples, the waste profile interface may display a thirteenth selectable input 542 corresponding to transmitting an electronic waste transfer request 552 (comprising the waste profile) to a second device 550 associated with the first waste facility (and/or a second user associated with the first waste facility). For example, a selection of the thirteenth selectable input 542 may be received (via the waste profile interface).

Figure 5E:
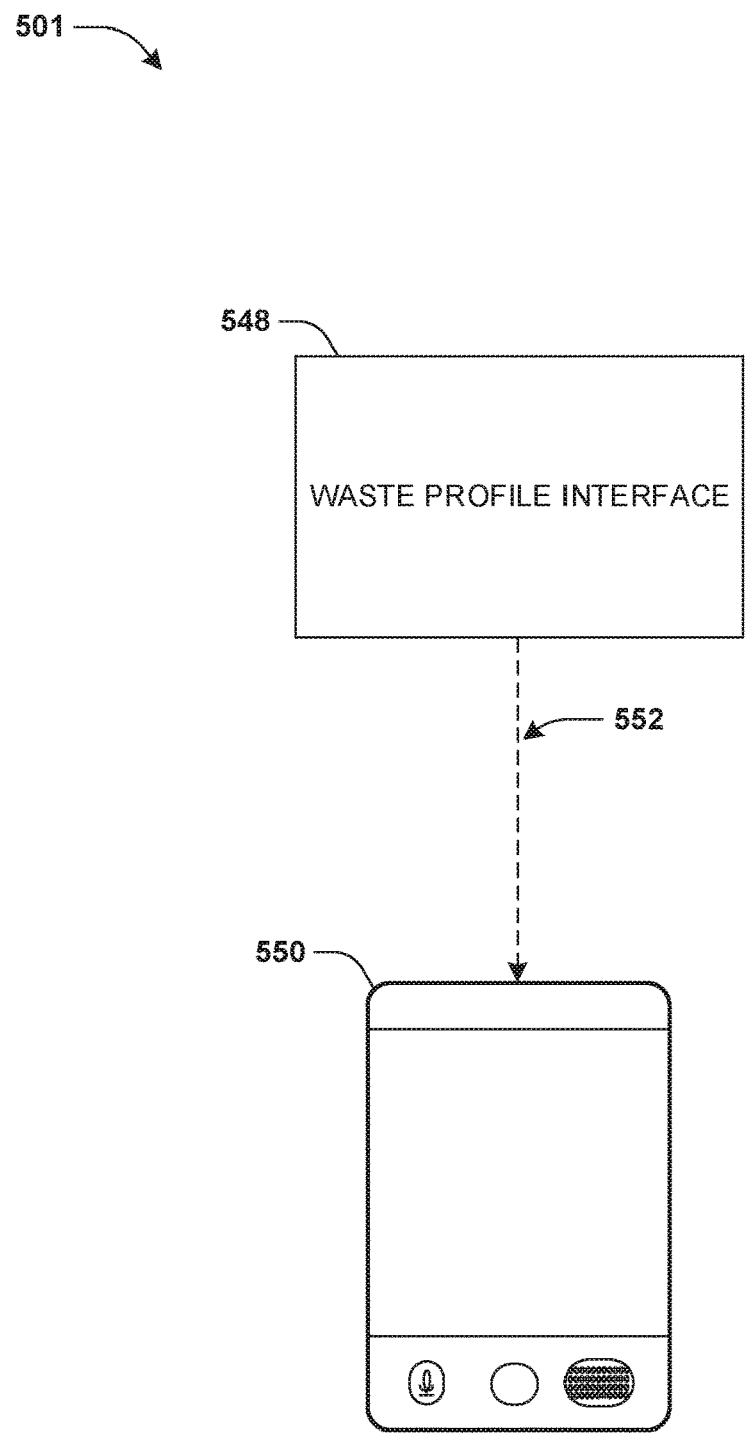
FIG. 5E is a component block diagram illustrating an example system for generating a waste profile based upon waste parameters of waste and/or determining waste facilities associated with the waste, where one or more servers associated with a waste profile interface transmits an electronic waste transfer request to a second device.

FIG. 5E illustrates the one or more servers 548 associated with the waste profile interface transmitting the electronic waste transfer request 552 (comprising the waste profile) to the second device 550 (associated with the first waste facility). In some examples, the electronic waste transfer request 552 and/or the waste profile may be displayed using the second device 500 responsive to the second user accessing the service using the second device. Alternatively and/or additionally, the electronic waste transfer request 552 may be transmitted via email, a messaging interface, etc. (to the second device). In some examples, the first waste facility may accept the waste.

Figure 5F:
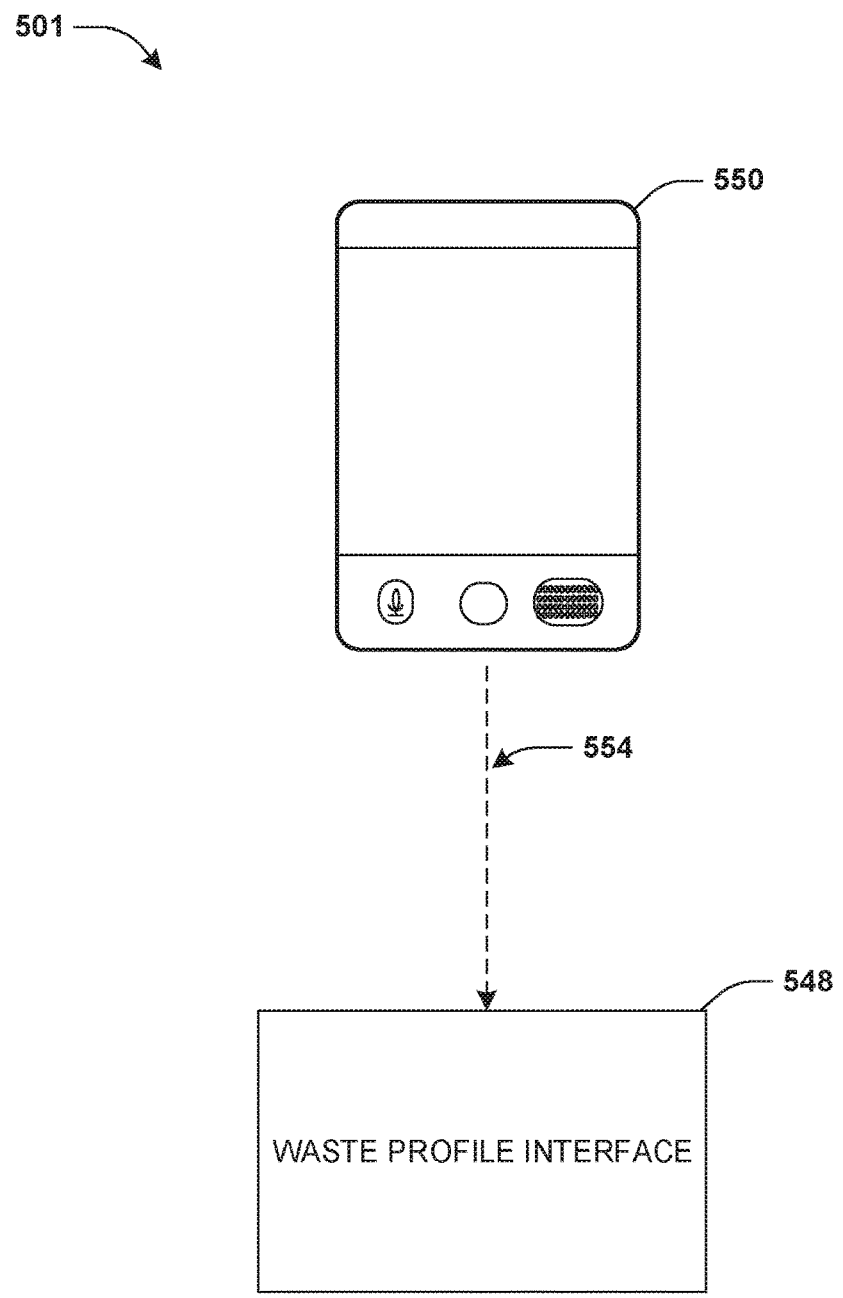
FIG. 5F is a component block diagram illustrating an example system for generating a waste profile based upon waste parameters of waste and/or determining waste facilities associated with the waste, where a second device transmits an acceptance message to one or more servers associated with a waste profile interface.
Figure 5G:
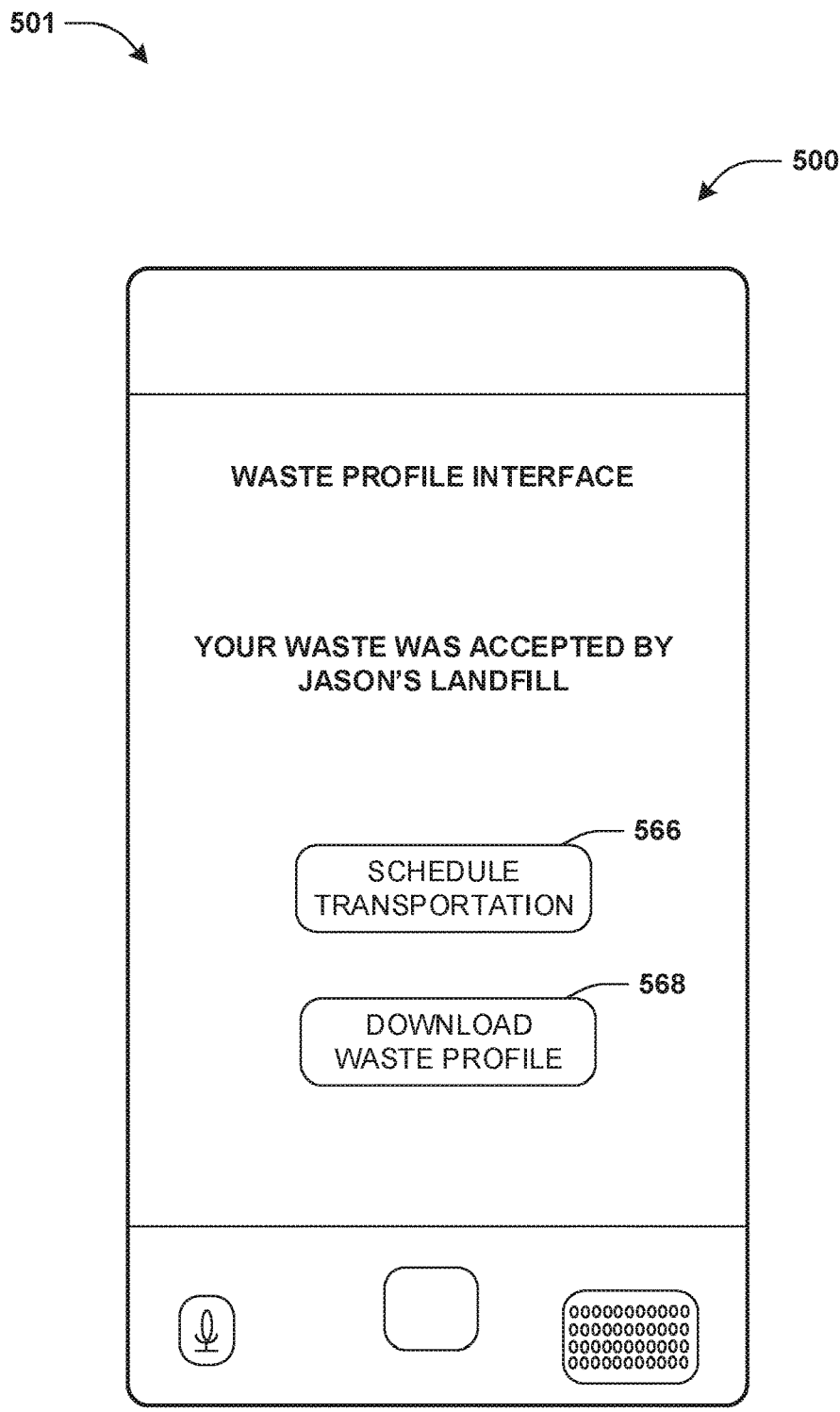
FIG. 5G is a component block diagram illustrating an example system for generating a waste profile based upon waste parameters of waste and/or determining waste facilities associated with the waste, where a graphical user interface of a first device is being controlled to display one or more indications of an acceptance message.

FIG. 5F illustrates the second device 550 transmitting an acceptance message 554 to the one or more servers 548 associated with the waste profile interface. For example, the acceptance message may comprise an indication that the first waste facility accepts the waste. FIG. 5G illustrates the graphical user interface of the first device 500 being controlled to display one or more indications of the acceptance message 554 (via the waste profile interface). The waste profile interface may display a fourteenth selectable input 566 corresponding to scheduling transportation of the waste from the waste generator to the first waste facility. The waste profile interface may display a fifteenth selectable input 568 corresponding to downloading the waste profile.

Figure 6:
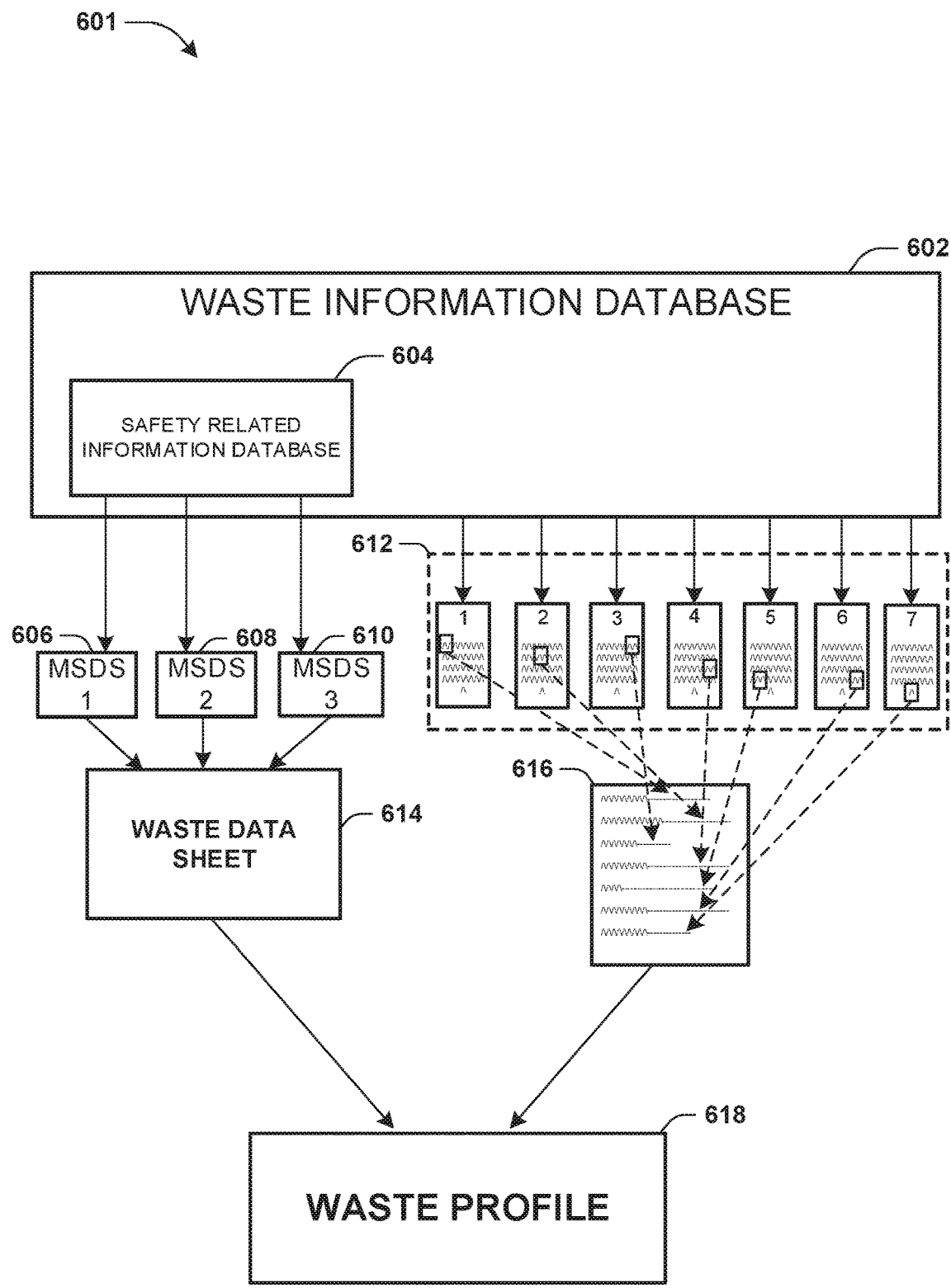
FIG. 6 is a component block diagram illustrating an example system for generating a waste profile based upon waste parameters of waste.

FIG. 6 illustrates an example of a system 601 for generating a waste profile based upon waste parameters of waste. For example, waste parameters of waste may be received using a waste profile interface, such as presented in FIG. 5A of the present disclosure.

For example, one or more waste information databases 602 may be analyzed to identify a plurality of data records 612 associated with the waste parameters. A waste profile 618 may be generated based upon the plurality of data records 612. For example, a portion of the waste profile 618 may be generated by populating (e.g., automatically entering information into) an electronic waste profile form 616 associated with the waste profile 618 (using one or more algorithmic techniques and/or one or more other techniques). For example, the plurality of data records 612 may be analyzed to select waste profile-specific portions of information based upon a plurality of fields of the electronic waste profile form 616. For example, each profile-specific portion of information of the waste profile-specific portions of information may comprise information corresponding to a field of the plurality of fields. The waste profile-specific portions of information may be extracted (from the plurality of data records 612) and/or entered into the electronic waste profile form 616. Each waste profile-specific portion of information of the waste profile-specific portions of information may be formatted, modified and/or combined with a separate waste profile-specific portion of information prior to being entered into a field of the plurality of fields (of the electronic waste profile form 616).

Alternatively and/or additionally, the waste parameters may indicate that the waste comprises three materials comprising a first material, a second material and a third material. For example, a first set of safety related information 606, comprising a first MSDS associated with the first material, may be extracted from a safety related information database 604 and/or the one or more waste information databases 602. For example, the one or more waste information databases 602 may comprise the safety related information database 604. Alternatively and/or additionally, a second set of safety related information 608, comprising a second MSDS associated with the second material, may be extracted from the safety related information database 604 and/or the one or more waste information databases 602. Alternatively and/or additionally, a third set of safety related information 610, comprising a third MSDS associated with the third material, may be extracted from the safety related information database 604 and/or the one or more waste information databases 602. In some examples, the first set of safety related information 606, the second set of safety related information 608 and/or the third set of safety related information 610 may be combined (e.g., using one or more algorithmic techniques and/or one or more other techniques) to generate a waste data sheet 614.

In some examples, the waste data sheet 614 and/or the (populated) electronic waste profile form 616 may be combined to generate the waste profile 618. For example, the waste profile 618 may comprise the waste data sheet 614 and the electronic waste profile form 616. Alternatively and/or additionally, the waste profile 618 may (merely) comprise the waste data sheet 614. Alternatively and/or additionally, the waste profile 618 may (merely) comprise the electronic waste profile form 616.

FIG. 7 illustrates an exemplary electronic waste profile form 700 comprising a plurality of fields. For example, the plurality of fields may comprise a first set of fields 702 corresponding to information sets associated with a waste generator. Alternatively and/or additionally, the plurality of fields may comprise a second set of fields 704 corresponding to information sets associated with an origin of waste (and/or one or more materials associated with the waste) associated with the waste generator. Alternatively and/or additionally, the plurality of fields may comprise a third set of fields 706 corresponding to information sets associated with a waste facility (that the waste generator may want to receive, process, dispose of, etc. the waste). Alternatively and/or additionally, the plurality of fields may comprise a fourth set of fields 708 corresponding to information sets associated with billing information. Alternatively and/or additionally, the plurality of fields may comprise a fifth set of fields 710 corresponding to information sets associated with transportation and/or transportation services for transporting the waste from the waste generator (to the waste facility). Alternatively and/or additionally, the plurality of fields may comprise a sixth set of fields 712 corresponding to information sets associated with (characteristics of) the one or more materials. Alternatively and/or additionally, the plurality of fields may comprise a seventh set of fields 714 corresponding to information sets associated with regulatory information associated with the waste (e.g., codes, governing laws and/or regulations associated with the waste, etc.)

It may be appreciated that the disclosed subject matter may assist a user (e.g., and/or a device associated with the user) in generating a waste profile based upon (user-defined) waste parameters associated with waste and/or determining characteristics of the waste. Alternatively and/or additionally, the disclosed subject matter may assist the user in identifying waste facilities that can accept the waste and sending electronic waste transfer requests to one or more waste facilities.

Implementation of at least some of the disclosed subject matter may lead to benefits including, but not limited to, enabling the device to efficiently, quickly and accurately generate a waste profile associated with waste in an efficient and cost-effective manner. Alternatively and/or additionally, implementation of at least some of the disclosed subject matter may lead to benefits including enabling the device to efficiently, quickly and accurately identify one or more waste facilities that accept the waste and schedule transportation of the waste to a waste facility in an efficient and cost-effective manner, wherein the transportation may be scheduled before a threshold amount of the waste is generated and the waste (and/or the threshold amount of waste) may not need to be stored for extended periods of time before the waste is transported to the waste facility.

Alternatively and/or additionally, implementation of at least some of the disclosed subject matter may lead to benefits including improving the speed and ease by which waste-related information is processed and transferred between devices and/or improving interfaces usable for facilitating the movement of waste. Data from various sources may be aggregated and manipulated in a manner that results in waste-related actions associated with the data being performed in less time, with less overhead, using less resources, etc. At least some of the disclosed subject matter may further provide for an improved platform for communication (e.g., over a network) between remote devices of users associated with waste-related actions, which may increase the speed at which communication may be established and/or decrease obstacles to effective communication.

Alternatively and/or additionally, implementation of at least some of the disclosed subject matter may lead to benefits including a reduction in (e.g., and/or an improved usability of) screen space and/or an improved usability of a display (e.g., of the device) (e.g., as a result of the waste profile interface automatically identifying data records comprising information associated with the waste profile and generating the waste profile based upon the information, wherein separate windows and/or applications may not need to be opened in order to determine the information, as a result of enabling the device to display a list of waste facilities associated with the waste profile without needing to open separate windows and/or applications, etc.).

In some examples, at least some of the disclosed subject matter may be implemented on a client device, and in some examples, at least some of the disclosed subject matter may be implemented on a server (e.g., hosting a service accessible via a network, such as the Internet).

It may be appreciated that "waste" used herein may describe a spent item or material, a derivative and/or a by-product of a process (e.g., a waste stream), unwanted materials left over from a process or refuse from places of human or animal habitation, and comprises hazardous waste (e.g., industrial waste and household waste), non-hazardous waste (e.g., industrial waste and municipal solid waste), recyclables, organics and/or manufacturing by-products.

Figure 8:
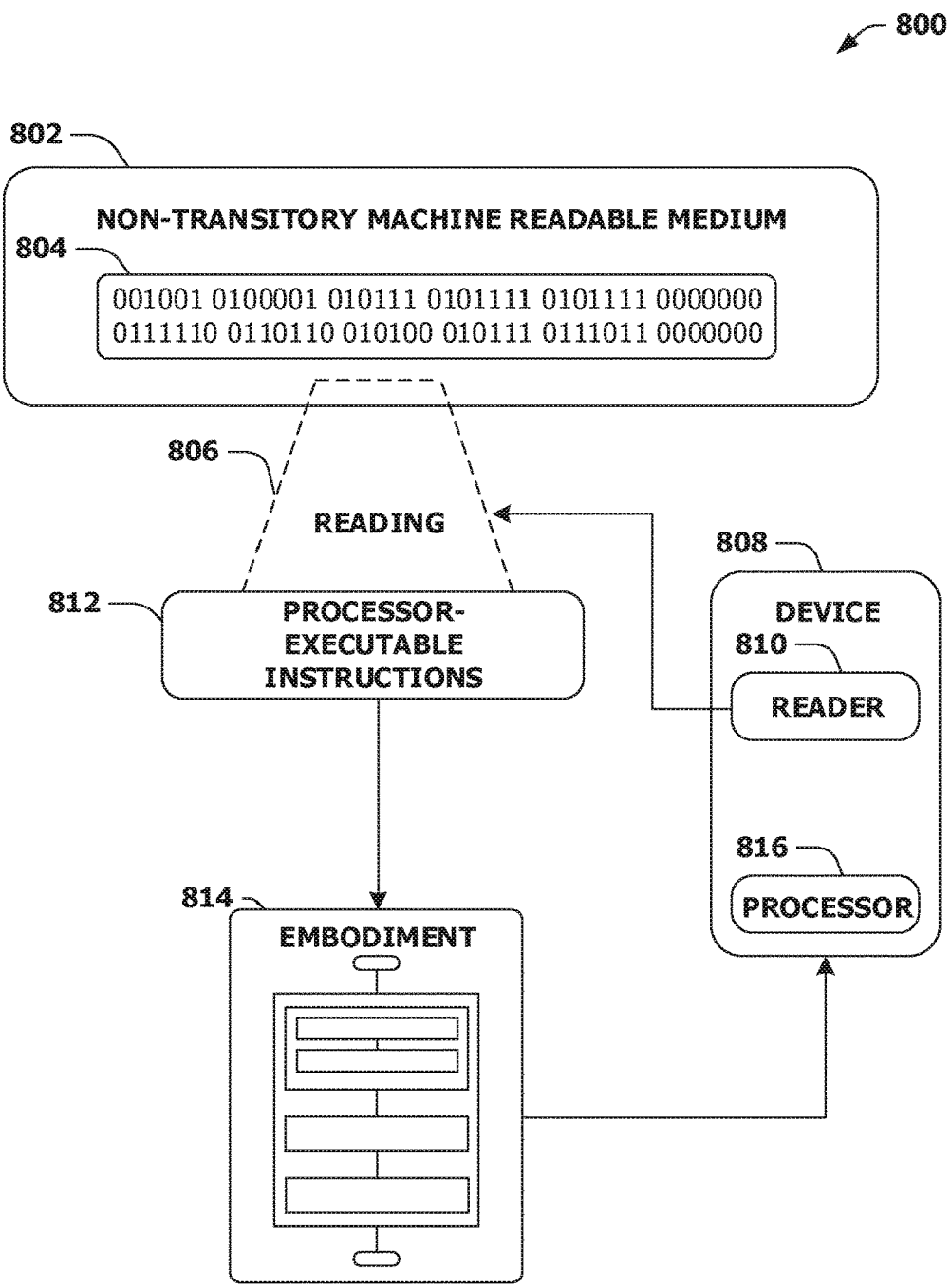
FIG. 8 is an illustration of a scenario featuring an example non-transitory machine readable medium in accordance with one or more of the provisions set forth herein.

FIG. 8 is an illustration of a scenario 800 involving an example non-transitory machine readable medium 802. The non-transitory machine readable medium 802 may comprise processor-executable instructions 812 that when executed by a processor 816 cause performance (e.g., by the processor 816) of at least some of the provisions herein (e.g., embodiment 814).

The non-transitory machine readable medium 802 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk).

The example non-transitory machine readable medium 802 stores computer-readable data 804 that, when subjected to reading 806 by a reader 810 of a device 808 (e.g., a read head of a hard disk drive, or a read operation invoked on a solid-state storage device), express the processor-executable instructions 812.

In some embodiments, the processor-executable instructions 812, when executed, cause performance of operations, such as at least some of the example method 400 of FIG. 4, for example. In some embodiments, the processor-executable instructions 812 are configured to cause implementation of a system, such as at least some of the example system 501 of FIGS. 5A-5G, the example system 601 of FIG. 6 and/or a system using the exemplary electronic waste profile form 700 of FIG. 7, for example.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
controlling a graphical user interface of a device to display a waste profile interface comprising one or more selectable inputs;
receiving, via the waste profile interface, a request to generate a waste profile associated with waste, wherein the request comprises waste parameters of the waste;
analyzing one or more waste information databases to identify data records associated with the waste parameters;
generating a waste profile associated with the waste, based upon the data records;
analyzing, based upon the waste profile, one or more waste facility information databases, associated with a plurality of waste facilities, to identify a set of waste facilities based upon a determination that each waste facility of the set of waste facilities has previously accepted, and not rejected, one or more types of waste associated with the waste profile;
generating a list of waste facilities, based upon the set of waste facilities, wherein the list of waste facilities comprises one or more representations of each waste facility of the set of waste facilities;
controlling the graphical user interface of the device to display the list of waste facilities;
receiving a selection of a first waste facility of the list of waste facilities, from the device;
responsive to receiving the selection of the first waste facility, transmitting an electronic waste transfer request, associated with the waste, over a network connection to a second device associated with the first waste facility, wherein the electronic waste transfer request comprises the waste profile; and
one of:
receiving an acceptance message from the second device comprising an indication that the first waste facility accepts the waste; or
receiving a rejection message from the second device comprising an indication that the first waste facility rejects the waste.

2. The method of claim 1, wherein:
the waste parameters comprises one or more indications of one or more materials of the waste; and
the analyzing the one or more waste information databases comprises identifying the data records based upon a determination that the data records are associated with the one or more materials.

3. The method of claim 1, wherein:
the one or more waste information databases comprise a waste safety-related information database comprising a plurality of sets of safety-related information associated with a plurality of materials, wherein each set of safety-related information of the plurality of sets of safety-related information corresponds to a material of the plurality of materials;
the analyzing the one or more waste information databases comprises identifying one or more sets of safety-related information corresponding to one or more materials associated with the waste parameters; and
the data records comprises the one or more sets of safety-related information.

4. The method of claim 3, comprising:
combining the one or more sets of safety-related information to generate waste-specific safety-related information associated with the waste, wherein the generating the waste profile is performed based upon the waste-specific safety-related information.

5. The method of claim 4, wherein each set of safety-related information of the plurality of sets of waste safety-related information comprises at least one of a material safety data sheet (MSDS), a safety data sheet (SDS), a product safety data sheet (PSDS) or a product data sheet (PDS) associated with a material of the plurality of materials.

6. The method of claim 1, wherein:
the one or more waste facility information databases comprise a plurality of sets of permit information associated with the plurality of waste facilities, wherein each set of permit information of the plurality of sets of permit information corresponds to a waste facility of the plurality of waste facilities;
the analyzing the one or more waste facility information databases comprises analyzing the plurality of sets of permit information; and
each waste facility of the set of waste facilities is identified based upon a determination that a set of permit information corresponding to the waste facility matches the waste profile.

7. The method of claim 1, comprising:
classifying the waste based upon the waste parameters and the data records to generate one or more classifications associated with the waste, wherein the waste profile comprises one or more indications of the one or more classifications associated with the waste.

8. The method of claim 7, wherein:
the waste parameters comprise one or more indications of one or more processes for generating the waste; and
the classifying the waste is performed based upon the one or more indications of the one or more processes.

9. The method of claim 8, wherein:
the one or more waste facility information databases comprise a plurality of sets of permit information associated with the plurality of waste facilities, wherein each set of permit information of the plurality of sets of permit information corresponds to a waste facility of the plurality of waste facilities; and
the analyzing the one or more waste facility information databases comprises analyzing the plurality of sets of permit information; and
each waste facility of the set of waste facilities is identified based upon a determination that a set of permit information corresponding to the waste facility matches the one or more classifications associated with the waste.

10. The method of claim 1, wherein the one or more waste facility information databases comprise a plurality of sets of historical records associated with the plurality of waste facilities, wherein each set of historical records of the plurality of sets of historical records corresponds to types of waste that a waste facility of the plurality of waste facilities has previously accepted.

11. The method of claim 1, wherein the electronic waste transfer request is transmitted over the network connection to the second device before the waste is generated.

12. The method of claim 1, wherein the electronic waste transfer request is transmitted over the network connection to the second device before the waste is scheduled for transport to the first waste facility.

13. The method of claim 1, the generating the waste profile comprising:
 selecting waste profile-specific portions of information from the data records based upon fields of an electronic waste profile form; and
 entering the waste profile-specific portions of information into the fields of the electronic waste profile form.

14. The method of claim 1, comprising:
 generating a safety document comprising at least a portion of the waste profile, wherein the safety document comprises at least one of spill-handling instructions or one or more safety hazards associated with the waste; and
 transmitting the safety document to the device, wherein:
 the safety document is printed; and
 at least one of:
  the safety document is coupled to a container holding the waste during transport to a waste facility; or
  the safety document is placed within a transportation vehicle transporting the waste to the waste facility.

15. The method of claim 1, comprising:
 generating a safety document comprising at least a portion of the waste profile, wherein the safety document comprises at least one of spill-handling instructions or one or more safety hazards associated with the waste;
 transferring the safety document to an electronic storage device; and
 at least one of:
  coupling the electronic storage device to a container holding the waste during transport to a waste facility; or
  placing the electronic storage device within a transportation vehicle transporting the waste to the waste facility.

16. A method, comprising:
 controlling a graphical user interface of a device to display a waste profile interface comprising one or more selectable inputs;
 receiving, via the waste profile interface, a request to generate a waste profile associated with waste, wherein the request comprises waste parameters of the waste;
 analyzing one or more waste information databases to identify data records associated with the waste parameters;
 generating the waste profile based upon the waste parameters and the data records;
 transmitting an electronic waste transfer request associated with the waste over a network connection to a second device associated with a waste facility, wherein the electronic waste transfer request comprises the waste profile, wherein the waste facility is selected based upon a determination that the waste facility previously accepted, and did not reject, a type of waste associated with the waste; and
 one of:
  receiving an acceptance message from the second device comprising an indication that the waste facility accepts the waste; or
  receiving a rejection message from the second device comprising an indication that the waste facility rejects the waste.

17. The method of claim 16, wherein the transmitting the electronic waste transfer request over the network connection to the second device is performed responsive to receiving a selection of the waste facility from the device.

18. A system, comprising:
 a memory comprising instructions for performing a method; and
 a processor coupled to the memory, the processor configured to execute the instructions to perform operations comprising:
  controlling a graphical user interface of a device to display a waste profile interface comprising one or more selectable inputs;
  receiving, via the waste profile interface, a request to generate a waste profile associated with waste, wherein the request comprises waste parameters of the waste;
  analyzing one or more waste information databases to identify data records associated with the waste parameters;
  generating a waste profile associated with the waste, based upon the data records;
  analyzing, based upon the waste profile, one or more waste facility information databases, associated with a plurality of waste facilities, to identify a set of waste facilities based upon a determination that each waste facility of the set of waste facilities has at least one of previously accepted one or more types of waste associated with the waste profile or has capabilities for processing one or more types of waste associated with the waste profile;
  generating a list of waste facilities, based upon the set of waste facilities, wherein the list of waste facilities comprises one or more representations of each waste facility of the set of waste facilities;
  controlling the graphical user interface of the device to display the list of waste facilities;
  receiving a selection of a first waste facility of the list of waste facilities, from the device;
  responsive to receiving the selection of the first waste facility, transmitting an electronic waste transfer request, associated with the waste, over a network connection to a second device associated with the first waste facility, wherein the electronic waste transfer request comprises the waste profile; and
  one of:
   receiving an acceptance message from the second device comprising an indication that the first waste facility accepts the waste; or
   receiving a rejection message from the second device comprising an indication that the first waste facility rejects the waste.

19. The system of claim 18, the operations comprising:
 generating a safety document comprising at least a portion of the waste profile, wherein the safety document comprises at least one of spill-handling instructions or one or more safety hazards associated with the waste; and
transmitting the safety document to the device, wherein:
the safety document is printed; and
at least one of:
  the safety document is coupled to a container holding the waste during transport to a waste facility; or
  the safety document is placed within a transportation vehicle transporting the waste to the waste facility.

20. The system of claim 18, the operations comprising:
generating a safety document comprising at least a portion of the waste profile, wherein the safety document comprises at least one of spill-handling instructions or one or more safety hazards associated with the waste;
transferring the safety document to an electronic storage device; and
at least one of:
  coupling the electronic storage device to a container holding the waste during transport to a waste facility; or
  placing the electronic storage device within a transportation vehicle transporting the waste to the waste facility.

* * * * *